US012340151B2

(12) United States Patent
Palmaro

(10) Patent No.: US 12,340,151 B2
(45) Date of Patent: *Jun. 24, 2025

(54) SYSTEMS AND METHODS FOR SMART VOLUMETRIC LAYOUTS

(71) Applicant: Unity Technologies ApS, Copenhagen (DK)

(72) Inventor: Gregory Lionel Xavier Jean Palmaro, San Francisco, CA (US)

(73) Assignee: Unity Technologies ApS, Copenhagen (DK)

( * ) Notice: Subject to any disclaimer, the term of this patent is extended or adjusted under 35 U.S.C. 154(b) by 0 days.

This patent is subject to a terminal disclaimer.

(21) Appl. No.: 18/528,354

(22) Filed: Dec. 4, 2023

(65) Prior Publication Data

US 2024/0176920 A1 May 30, 2024

Related U.S. Application Data

(63) Continuation of application No. 17/535,328, filed on Nov. 24, 2021, now Pat. No. 11,875,088.

(Continued)

(51) Int. Cl.
*G06F 3/04815* (2022.01)
*G06F 3/04845* (2022.01)
(Continued)

(52) U.S. Cl.
CPC .......... *G06F 30/12* (2020.01); *G06F 3/04815* (2013.01); *G06F 3/04845* (2013.01); *G06F 2111/18* (2020.01)

(58) Field of Classification Search
CPC .... G06F 18/00; G06F 18/214; G06F 2111/04; G06F 2111/08; G06F 30/00; G06F 30/12; G06F 30/17; G06F 30/18; G06F 30/27; G06F 1/03; G06F 5/01; G06F 7/50; G06F 7/535; G06F 3/048; G06F 3/0481; G06F 3/0482; G06F 3/0488; G06F 3/04883; G06F 3/0483; G06F 3/04845; G06F 3/04886; G06F 1/16; G06F 16/954; G06F 3/00;
(Continued)

(56) References Cited

U.S. PATENT DOCUMENTS 12,008,216 B1* 6/2024 Boesel .................. G06F 3/0483
2016/0196659 A1* 7/2016 Vrcelj ....................... G06T 7/11
382/154

(Continued)

OTHER PUBLICATIONS

U.S. Appl. No. 17/535,328, Notice of Allowance mailed Aug. 31, 2023, 9 pgs.

*Primary Examiner* — Rayeez R Chowdhury
(74) *Attorney, Agent, or Firm* — Schwegman Lundberg & Woessner, P.A.

(57) ABSTRACT

A method of digital content generation is disclosed. A description of a smart volumetric layout is accessed. The smart volumetric layout includes an arrangement of one or more smart volumetric shapes. Smart shape data is associated to a volumetric shape of the one or more volumetric shapes. The smart shape data includes one or more properties and one or more behaviors. A presence of one or more digital objects is detected in the smart volumetric shape. One or more properties and the one or more behaviors associated with the smart volumetric shape are applied to the one or more digital objects.

20 Claims, 19 Drawing Sheets

Related U.S. Application Data

(60) Provisional application No. 63/117,977, filed on Nov. 24, 2020.

(51) Int. Cl.
*G06F 30/12* (2020.01)
*G06F 111/18* (2020.01)

(58) Field of Classification Search
CPC ............. G06F 3/04815; G06F 3/04817; G06F 3/0484; G06F 3/04842; G06F 3/0485; G06F 3/0486; G06F 3/0489; G06F 3/14; G06F 9/00
See application file for complete search history.

(56) References Cited

U.S. PATENT DOCUMENTS

| | | | |
|---|---|---|---|
| 2019/0019348 A1* | 1/2019 | Yamamoto | G06F 3/017 |
| 2021/0256175 A1* | 8/2021 | Bailey | G06F 30/31 |
| 2022/0130145 A1* | 4/2022 | Connary | G06T 15/20 |
| 2022/0164491 A1 | 5/2022 | Palmaro | |
| 2022/0207199 A1* | 6/2022 | Ha | G06F 3/0425 |
| 2024/0265630 A1* | 8/2024 | Vianello | G06T 17/00 |

* cited by examiner

US 12,340,151 B2

SYSTEMS AND METHODS FOR SMART VOLUMETRIC LAYOUTS

CROSS-REFERENCE TO RELATED APPLICATIONS

This application is a continuation of and claims the benefit of priority under 35 U.S.C. § 120 to U.S. patent application Ser. No. 17/535,328, filed on Nov. 24, 2021, which claims the benefit of U.S. Provisional Application No. 63/117,977, filed Nov. 24, 2020, entitled "SYSTEMS AND METHODS FOR SMART VOLUMETRIC LAYOUTS," each of which is incorporated by reference herein in its entirety.

TECHNICAL FIELD

The subject matter disclosed herein generally relates to the technical field of computer graphics systems, and in one specific example, to computer systems and methods for creating and manipulating intelligent 3D layouts.

BACKGROUND OF THE INVENTION

Generating digital content in 3D environments is difficult, time consuming, and requires a degree of competence from a creator. In particular, generation of interactive 3D content often requires advanced skill in programming. In addition, generating interactive 3D content is currently limited to a single output, wherein a created interactive 3D content is limited with included content until the content is manually changed. The generating of interactive 3D content is thus manually intensive.

BRIEF DESCRIPTION OF THE DRAWINGS

Features and advantages of example embodiments of the present disclosure will become apparent from the following detailed description, taken in combination with the appended drawings, in which.

It will be noted that throughout the appended drawings, like features are identified by like reference numerals.

DETAILED DESCRIPTION

Figure 1A:
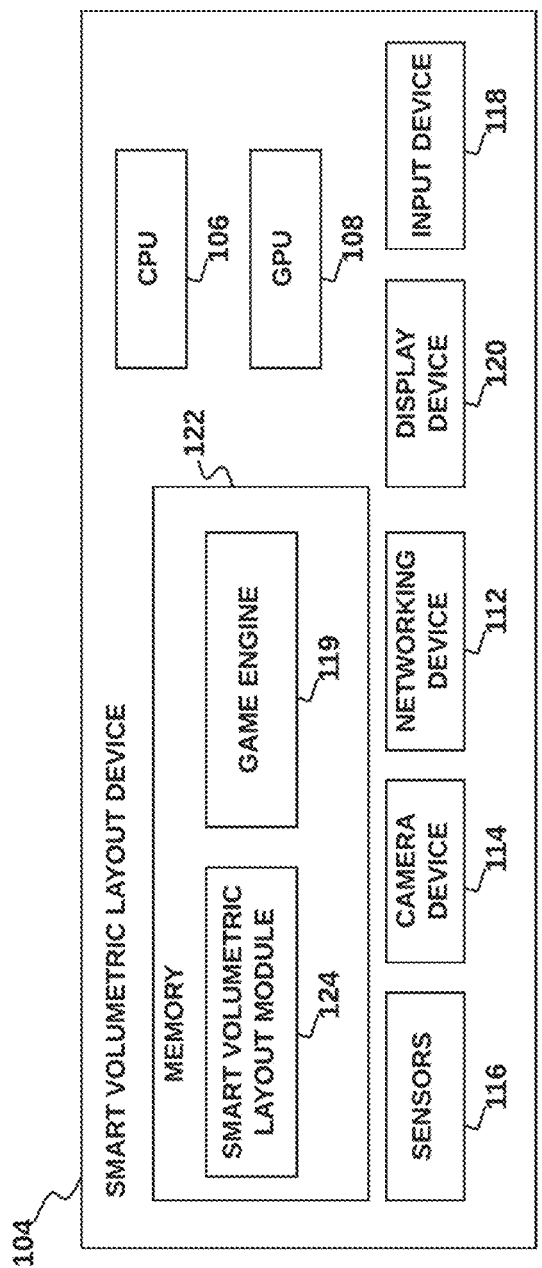
FIG. 1A is a schematic illustrating a smart volumetric layout device, in accordance with one embodiment.

The description that follows describes example systems, methods, techniques, instruction sequences, and computing machine program products that comprise illustrative embodiments of the disclosure, individually or in combination. In the following description, for the purposes of explanation, numerous specific details are set forth in order to provide an understanding of various embodiments of the inventive subject matter. It will be evident, however, to those skilled in the art, that various embodiments of the inventive subject matter may be practiced without these specific details.

The term 'content' used throughout the description herein should be understood to include all forms of media content items, including images, videos, audio, text, 3D models (e.g., including textures, materials, meshes, and more), animations, vector graphics, and the like.

The term 'game' used throughout the description herein should be understood to include video games and applications that execute and present video games on a device, and applications that execute and present simulations on a device. The term 'game' should also be understood to include programming code (either source code or executable binary code) which is used to create and execute the game on a device.

The term 'environment' used throughout the description herein should be understood to include 2D digital environments (e.g., 2D video game environments, 2D simulation environments, 2D content creation environments, and the like), 3D digital environments (e.g., 3D game environments, 3D simulation environments, 3D content creation environments, virtual reality environments, and the like), and augmented reality environments that include both a digital (e.g., virtual) component and a real-world component.

The term 'digital object', used throughout the description herein is understood to include any object of digital nature, digital structure or digital element within an environment. A digital object can represent (e.g., in a corresponding data structure) almost anything within the environment; including 3D digital models (e.g., characters, weapons, scene elements (e.g., buildings, trees, cars, treasures, and the like)) with 3D model textures, backgrounds (e.g., terrain, sky, and the like), lights, cameras, effects (e.g., sound and visual), animation, and more. The term 'digital object' may also be understood to include linked groups of individual digital objects. A digital object is associated with data that describes properties and behavior for the object.

The terms 'asset', 'game asset', and 'digital asset', used throughout the description herein are understood to include any data that can be used to describe a digital object or can be used to describe an aspect of a digital project (e.g., including: a game, a film, a software application). For example, an asset can include data for an image, a 3D model (textures, rigging, and the like), a group of 3D models (e.g., an entire scene), an audio sound, a video, animation, a 3D mesh and the like. The data describing an asset may be stored within a file, or may be contained within a collection of files, or may be compressed and stored in one file (e.g., a compressed file), or may be stored within a memory. The data describing an asset can be used to instantiate one or more digital objects within a game at runtime (e.g., during execution of the game).

The term 'build' and 'game build' used throughout the description herein should be understood to include a compiled binary code of a game which can be executed on a device, and which, when executed can provide a playable version of the game (e.g., playable by a human or by an artificial intelligence agent).

Throughout the description herein, the term 'authoring' is meant to include the creation and editing of 3D content, mixed reality experiences and the digital content therein. Authoring may include direct manipulation of digital content (e.g., by a user) as it appears in a 3D virtual environment or mixed reality environment via a mobile device (e.g., head mounted display, mobile phone, tablet, and the like) or via a user interface on a computer screen (e.g., desktop or laptop).

Throughout the description herein, the term 'AI agent' should be understood to include entities such as a non-player character (NPC), a robot, and a game world which are controlled by a trained artificial intelligence system or model.

Throughout the description herein, the term 'mixed reality' (MR) should be understood to include all combined environments in the spectrum between reality and virtual reality (VR) including virtual reality, augmented reality (AR) and augmented virtuality.

A method of digital content generation is disclosed. A description of a smart volumetric layout is accessed. The smart volumetric layout includes an arrangement of one or more smart volumetric shapes. Smart shape data is associated to a volumetric shape of the one or more volumetric shapes. The smart shape data includes one or more properties and one or more behaviors. A presence of one or more digital objects is detected in the smart volumetric shape. One or more properties and the one or more behaviors associated with the smart volumetric shape are applied to the one or more digital objects.

The present invention includes apparatuses which perform one or more operations or one or more combinations of operations described herein, including specialized data processing systems which perform these methods and computer readable media storing instructions which, when executed on specialized data processing systems, cause the systems to perform these methods, operations, or combinations of operations, including non-routine and unconventional operations or combinations of operations.

Turning now to the drawings, systems and methods, including non-routine or unconventional components or operations, or combinations of such components or operations, for generating a smart volumetric layout in accordance with embodiments of the invention are illustrated. In accordance with an embodiment, FIG. 1A is an illustration of a smart volumetric layout device 104. In some embodiments, the smart volumetric layout device 104 is a mobile computing device, such as a smartphone, a tablet computer, a laptop computer, a head mounted virtual reality (VR) device or a head mounted augmented reality (AR) device. In other embodiments, the smart volumetric layout device 104 is a computing device such as a desktop computer.

In the example embodiment, the smart volumetric layout device 104 includes one or more central processing units (CPUs) 106 and graphics processing units (GPUs) 108. The processing device 106 is any type of processor, processor assembly comprising multiple processing elements (not shown), having access to a memory 122 to retrieve instructions stored thereon, and execute such instructions. Upon execution of such instructions, the instructions implement the processing device 106 to perform a series of tasks or operations, including one or more non-routine tasks or operations or one or more combinations of tasks and operations, as described herein (e.g., in reference to FIG. 2 and FIG. 3). The smart volumetric layout device 104 may also include one or more networking devices 112 (e.g., wired or wireless network adapters) for communicating across a network. The smart volumetric layout device 104 may further include one or more camera devices 114 which may be configured to capture digital video of the real world near a user during operation. The smart volumetric layout device 104 may also include one or more sensors 116, such as a global positioning system (GPS) receiver (e.g., for determining a GPS location of the smart volumetric layout device 104), biometric sensors (e.g., for capturing biometric data of a user), motion or position sensors (e.g., for capturing position data of a user or other objects), or an audio microphone (e.g., for capturing sound data). Some sensors 116 may be external to the smart volumetric layout device 104, and may be configured to wirelessly communicate with the smart volumetric layout device 104 (e.g., such as used in the Microsoft Kinect®, Vive Tracker™, MIT's Lidar sensor, or MIT's wireless emotion detector).

The smart volumetric layout device 104 also includes one or more input devices 118. The input device 118 is any type of input unit such as a mouse, a keyboard, a keypad, pointing device, a touchscreen, a microphone, a camera, a handheld device (e.g., hand motion tracking device) and the like, for inputting information in the form of a data signal readable by the processing device. The smart volumetric layout device 104 further includes one or more display devices 120, such as a touchscreen of a tablet or smartphone, or lenses or visor of a VR or AR HMD, which may be configured to display virtual objects to a user in conjunction with a real world view. The display device 120 is driven or controlled by one or more GPUs 108. The GPU 108 processes aspects of graphical output that assists in speeding up rendering of output through the display device 120.

The smart volumetric layout device 104 also includes a memory 122 configured to store a smart volumetric layout module 124. The memory 122 can be any type of memory device, such as random access memory, read only or rewritable memory, internal processor caches, and the like. The memory may also store a game engine 119 (e.g., executed by the CPU 106 or GPU 108) that communicates with the display device 120 and also with other hardware such as the input/output device (s) 118 to present a 3D game environment (e.g., a video game) or a 3D digital content creation environment on a display device 120. The game engine 119 would typically include one or more modules that provide the following: simulation of a virtual environment and digital objects therein (e.g., including animation of digital objects, animation physics for digital objects, collision detection for digital objects, and the like), rendering of the virtual environment and the digital objects therein, networking, sound, and the like in order to provide the user with a complete or partial virtual environment (e.g., including video game environment or simulation environment) via the display device 120. In accordance with an embodiment, the simulation and rendering of the virtual environment may be de-coupled, each being performed independently and concurrently, such that the rendering always uses a recent state of the virtual environment and current settings of the virtual environment to generate a visual representation at an interactive frame rate and, independently thereof, the simulation step updates the state of at least some of the digital objects (e.g., at another rate).

Figure 1B:
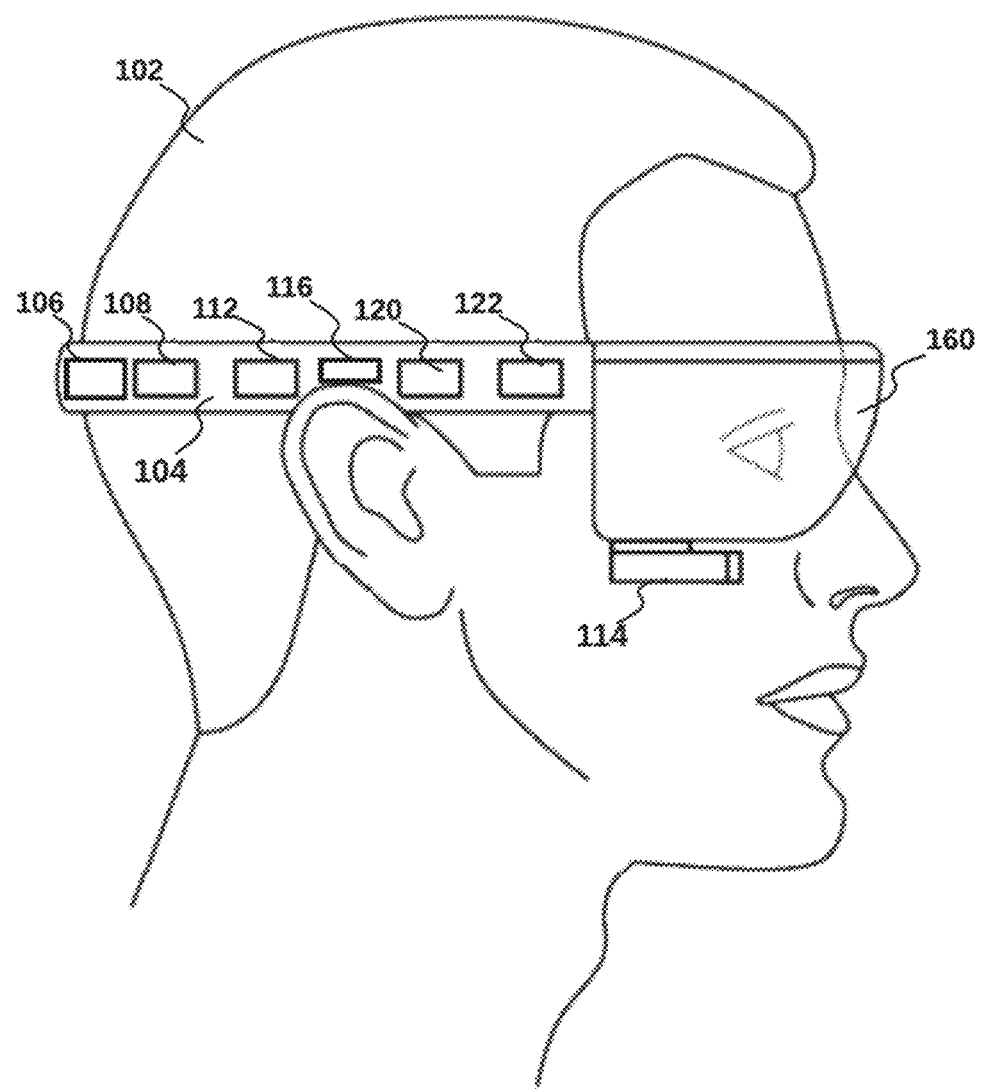
FIG. 1B is a schematic illustrating a smart volumetric layout device in head mounted display form, in accordance with one embodiment.

In accordance with some embodiments, the smart volumetric layout device 104 is a mobile computing device, such as a smartphone or a tablet computer. In accordance with other embodiments, and as shown in FIG. 1B, the smart volumetric layout device 104 is a head-mounted display (HMD) device worn by a user 102, such as an augmented reality (AR) or virtual reality (VR) visor (e.g., Google Glass®, HTC Vive®, Microsoft Hololens®, the PlayStation VR™, Oculus Rift™, and so forth). In the example embodiment, the user 102 (e.g., a human) experiences a VR environment or AR environment while wearing the HMD smart volumetric layout device 104. During operation, in the example embodiment, the HMD smart volumetric layout device 104 is mounted on a head of the wearer 102, and over both eyes of the wearer 102, as shown in FIG. 1B. The wearer 102 may be presented with a virtual environment which may be viewed and interacted with via the HMD 104 and handhelds as described herein (handhelds described below). The HMD smart volumetric layout device 104 includes a transparent or semi-transparent visor (or "lens" or "lenses") 124 through which the wearer 102 views their surroundings (also herein referred to as "the real world"). In other embodiments, the HMD smart volumetric layout device 104 may include an opaque visor 160 (not shown) which may obscure the wearer's 102 view of the real world and on which a complete virtual environment is displayed (e.g., including displaying video from the camera device 114 such as in a pass-through mode).

In accordance with an embodiment, the HMD smart volumetric layout device 104 shown in FIG. 1B includes components similar to the smart volumetric layout device 104 discussed in relation to FIG. 1A. For example, the HMD smart volumetric layout device 104 shown in FIG. 1B includes a display device 120, a networking device 112, a camera device 114, a CPU 106, a GPU 108, a memory 122, sensors 116, and one or more input devices 118 (input devices not explicitly shown in FIG. 1B). In the example embodiment, the display device 120 may render graphics (e.g., virtual objects) onto the visor 160. As such, the visor 160 acts as a "screen" or surface on which the output of the display device 120 appears, and through which the wearer 102 experiences virtual content. The display device 120 may be driven or controlled by one or more graphical processing units (GPUs) 108. In accordance with some embodiments, the display device 120 may include the visor 160.

In accordance with some embodiments, the digital camera device (or just "camera") 114 on the HMD smart volumetric layout device 104 is a forward-facing video input device that is oriented so as to capture at least a portion of a field of view (FOV) of the wearer 102. In other words, the camera 114 captures or "sees" an angle of view of the real world based on the orientation of the HMD device 104 (e.g., similar to what the wearer 102 sees in the wearer's 102 FOV when looking through the visor 160). The camera device 114 may be configured to capture real-world digital video around the wearer 102 (e.g., a field of view, a peripheral view, or a 360° view around the wearer 102). In some embodiments, output from the digital camera device 114 may be projected onto the visor 160 (e.g., in opaque visor embodiments), and may also include additional virtual content (e.g., added to the camera output). In some embodiments, the camera device 114 may be a depth camera capable of recording depth information within the surrounding environment. In other embodiments, there may be a depth camera in addition to a non-depth camera on the HMD 104.

In accordance with some embodiments, the HMD smart volumetric layout device 104 may include one or more sensors 116, or may be coupled in wired or wireless communication with the sensors 116. For example, the HMD smart volumetric layout device 104 may include motion or position sensors configured to determine a position or orientation of the HMD 104. In some embodiments, the HMD smart volumetric layout device 104 may include a microphone (not shown) for capturing audio input (e.g., spoken vocals of the user 102).

In accordance with some embodiments, the user 102 may hold one or more input devices 118 including hand tracking devices ("handhelds") (not separately shown in FIG. 1B) (e.g., one in each hand). The handhelds may provide information about an absolute or relative position and orientation of a user's hands and, as such, are capable of capturing hand gesture information. The handhelds may be configured to operate directly with the HMD smart volumetric layout device 104 (e.g., via wired or wireless communication). In some embodiments, the handhelds may be Oculus Touch™ hand controllers, HTC Vive™ hand trackers, PlayStation VR™ hand controllers, or the like. The handhelds may also include one or more buttons or joysticks built into the handhelds. In other embodiments, the user 102 may wear one or more wearable hand tracking devices (e.g., motion tracking gloves, not shown), such as those made commercially available by Manus VR™ (Netherlands). In still other embodiments, hand motion of the user 102 may be tracked without, or in addition to, the handhelds or wearable hand tracking devices via a hand position sensor (not shown, e.g., using optical methods to track the position and orientation of the user's hands) such as, for example, those made commercially available by Leap Motion™, Inc. (a California corporation). Such hand tracking devices (e.g., handhelds) track the position of one or more of the hands of the user during operation.

In some embodiments, the smart volumetric system 100 and the various specialized associated hardware and software components described herein may provide AR content instead of, or in addition to, VR content (e.g., in a mixed reality (MR) environment). It should be understood that the systems and methods described herein (e.g., specifically with respect to FIG. 2 and FIG. 3) may be performed with AR content and, as such, the scope of this disclosure covers both AR and VR applications.

Figure 1C:
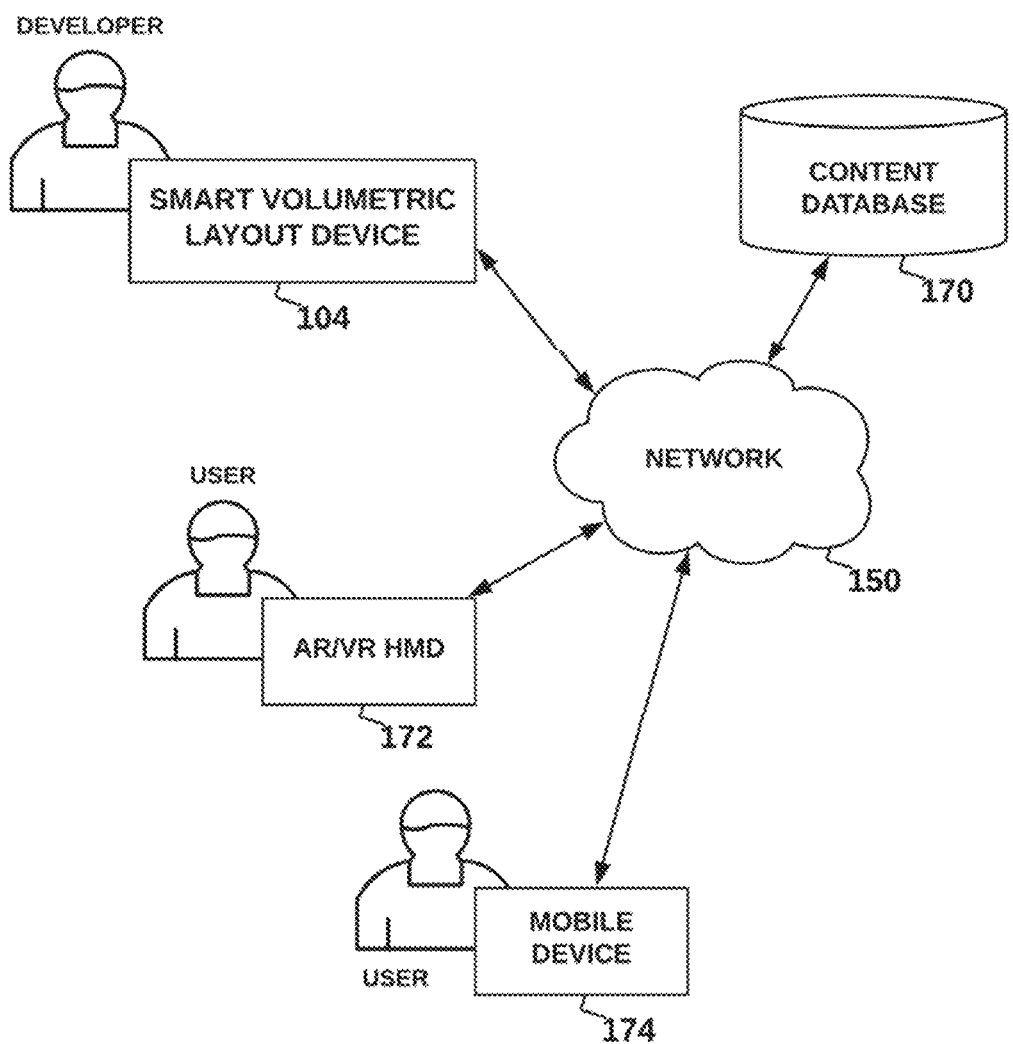
FIG. 1C is a schematic illustrating a smart volumetric layout system with a plurality of smart volumetric layout devices, in accordance with one embodiment.

In accordance with an embodiment, and shown in FIG. 1C is an example smart volumetric layout system 100 that includes a smart volumetric layout device 104, an AR/VR HMD 172 (similar to the smart volumetric layout HMD device 104 shown in FIG. 1B), a mobile device 174, and a content database 170 coupled in networked communication via a network 150 (e.g., a cellular network, a Wi-Fi network, the Internet, and so forth).

Figure 2:
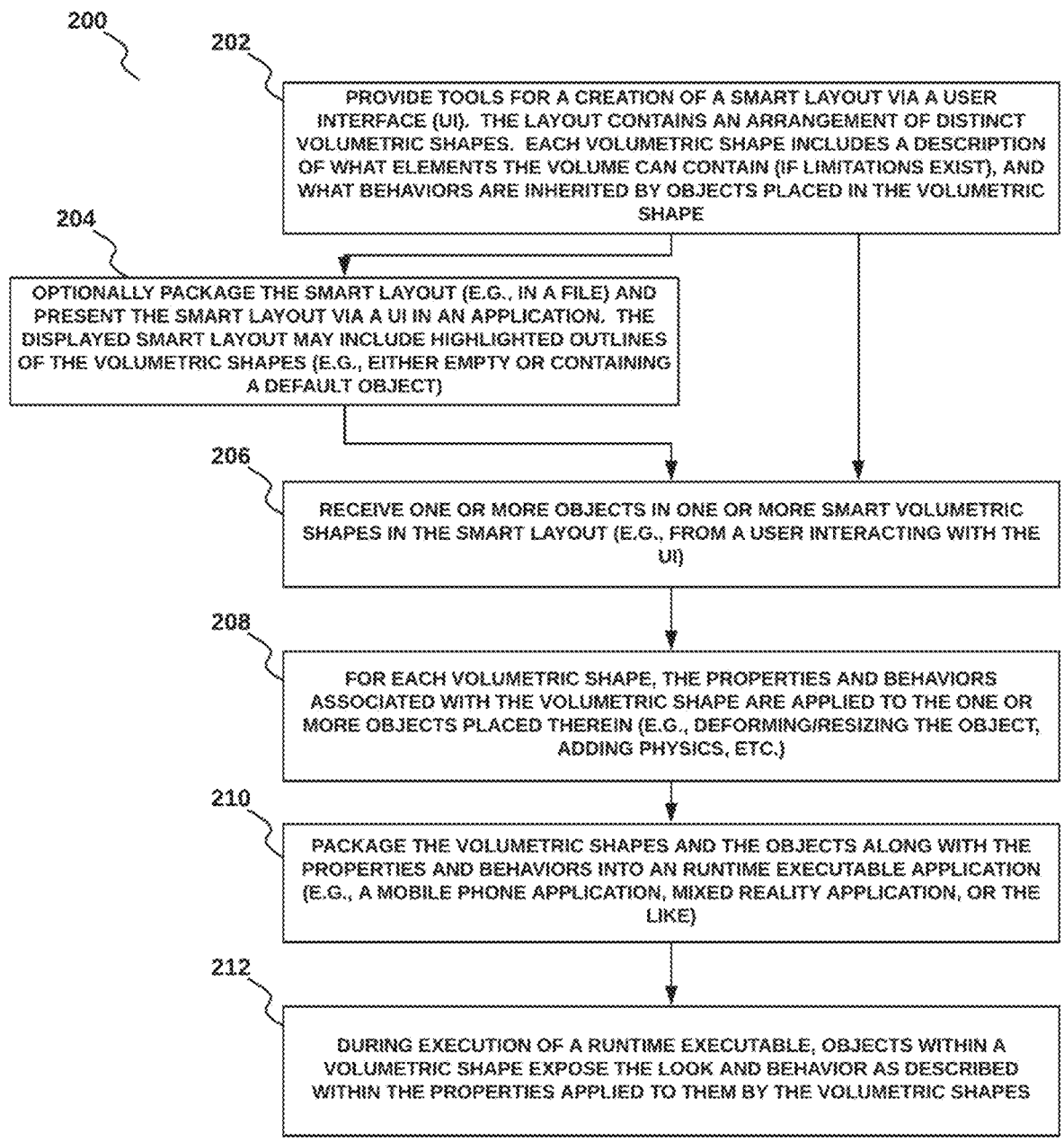
FIG. 2 is a schematic illustrating a flowchart for a method for generating a smart volumetric layout, in accordance with one embodiment.

In accordance with an embodiment, and shown in FIG. 2, is a flowchart of a method 200 for generating a smart volumetric layout. The smart volumetric layout is a configurable 3D layout that provides for control of placement and properties (e.g., a behavior) of content elements (e.g., 2D and 3D digital content) within the 3D layout. The method 200 may be used in conjunction with the smart volumetric layout system 100 and device 104 as described with respect to FIG. 1A, FIG. 1B, and FIG. 1C. In accordance with an embodiment, at operation 202 of the method 200, the smart volumetric layout module 124 is configured to create a smart volumetric layout, wherein the layout includes an arrangement of one or more smart volumetric shapes. In accordance with an embodiment, each smart volumetric shape includes associated data referred to herein as smart shape data, wherein the smart shape data includes data describing behaviors that are inherited by digital objects placed within the smart volumetric shape (e.g., digital objects placed during operation 206 described below). A behavior may include physics properties (e.g., used with a physics engine or game engine to determine motion of a digital object) and material properties for an object, including predetermined physical motion which may be associated with a real-world object (e.g., a balloon, a projectile, and the like). In accordance with an embodiment, the smart shape data may include data describing object properties that are inherited by digital objects placed within the smart volumetric shape (e.g., digital objects placed during operation 206 described below). In accordance with an embodiment, the smart shape data may also include a description of criteria (e.g., criteria that include digital object properties) to be satisfied for a digital object to be eligible to be placed within the smart volumetric shape. For example, the criteria may include limitations on object type (e.g., a digital object must be of a certain type), limitations on object data (e.g., a digital object must contain a type of data), limitations on digital object size or shape, and the like. In accordance with an embodiment, operation 202 may include providing tools within a user interface (UI) (e.g., as part of a specialized software application that includes the smart volumetric layout module 124 executing on a desktop, mobile computation device, mixed reality device, or the like), wherein the tools may be used (e.g., by a developer, designer, artist, etc.) to create and modify smart volumetric shapes (e.g., as described below with respect to the method 200). The provided tools may empower creators of all skill levels to produce desired 3D digital content results (e.g., a 3D digital environment, a video game, or the like) in less time than existing manual 3D content creation methods, and can be easily applied to any authoring context, including Film, Manufacturing, Construction, and Games.

Figure 3:
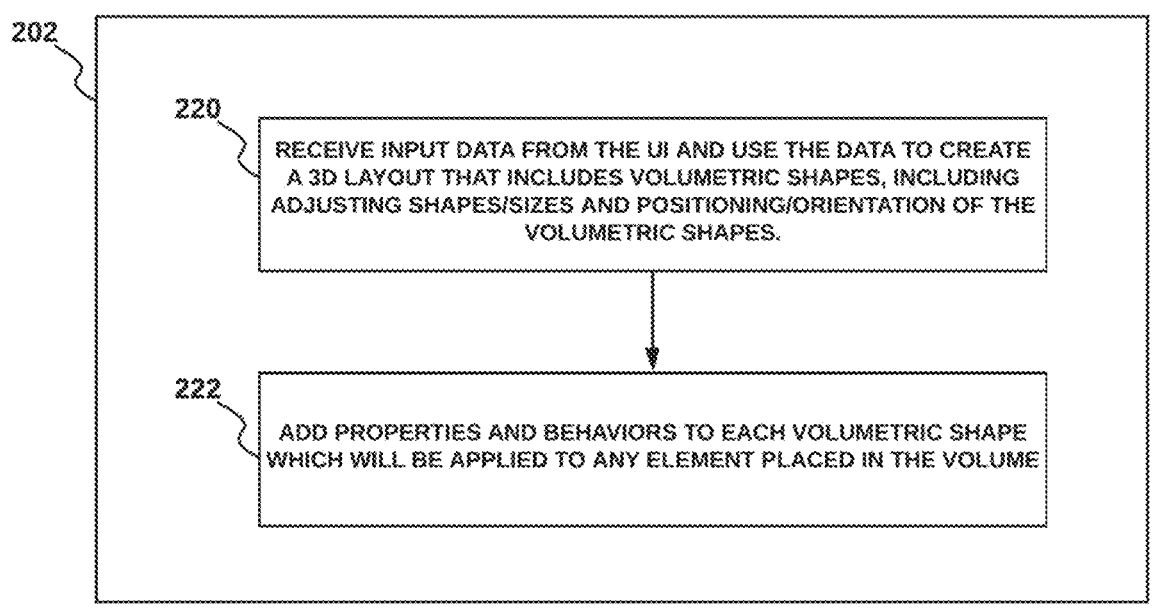
FIG. 3 is a schematic illustrating a flowchart for a method for creating a smart volumetric layout and adding properties and behaviors to volumetric shapes therein, in accordance with one embodiment.
Figure 4:
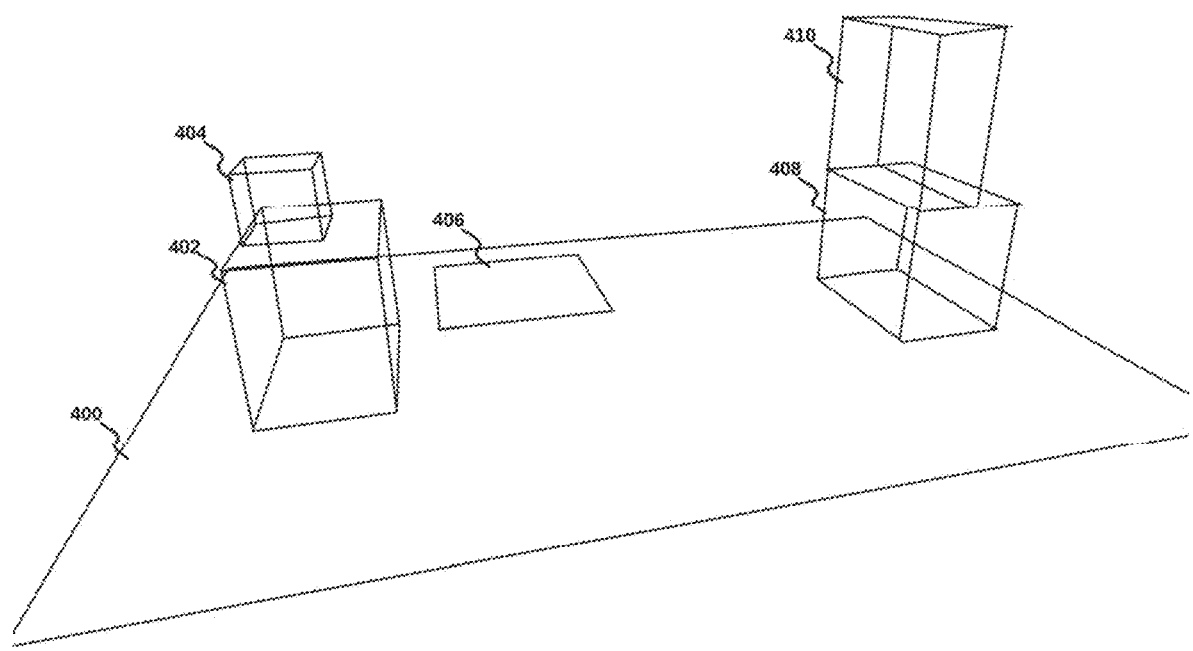
FIG. 4 is a schematic illustrating an example smart volumetric layout, in accordance with an embodiment.

In accordance with an embodiment, FIG. 3 shows more details from within operation 202. At operation 220, input from the tools within the UI (e.g., input as provided by a user) is used to create a 3D layout that includes smart volumetric shapes. Operation 220 may include receiving input from the UI and/or input devices 118 that describe a creation and modifying of the smart volumetric shapes, the modifying including modification of a shape, a size, a positioning, and an orientation. For example, the input may include motion tracking data and physical inputs from handheld devices (described above) from a user manipulating the smart volumetric shapes. In accordance with an embodiment, FIG. 4 shows an example smart volumetric layout 400 which may be created during operation 220. The smart volumetric layout 400 includes a plurality of smart volumetric shapes (402, 404, 406, 408, and 410) of different shapes and sizes. Each of the smart volumetric shapes (402, 404, 406, 408, and 410) may have been created, sized, and positioned as seen in FIG. 4 (e.g., by a user with a drag-and-drop methodology). Although the 3D smart volumetric shapes in the smart volumetric layout 400 are shown to be rectangular in FIG. 4, it should be understood that a smart volumetric shape may be any shape. In accordance with an embodiment, a smart volumetric shape may include a 2-dimensional area 406 whereon 3D digital objects may be placed (e.g., as in operation 206), and inherit properties and behaviors (e.g., as in operation 208).

Returning to FIG. 3, in accordance with an embodiment, at operation 222 of the operation 202, input from the tools within the UI (e.g., input as provided by a user) is analyzed and used to add properties and behaviors to one or more of the smart volumetric shapes. For example, as part of operation 222, a first volumetric shape 410 may be selected and assigned (e.g., by a user via the UI) one or more properties and behaviors. In accordance with an embodiment, operation 222 may include providing a plurality of behaviors and properties for selection, wherein the providing may be via drop down menus, drag and drop actions, importation processes, and the like.

Returning to FIG. 2, in accordance with an embodiment, in operation 204, the smart volumetric layout may be packaged (e.g., saved) in a file. The file may be distributed. In accordance with an embodiment, the file may be used by an application to display the packaged smart volumetric layout. The display may include highlighted outlines of the smart volumetric shapes (e.g., either empty or containing a default object).

Figure 5:
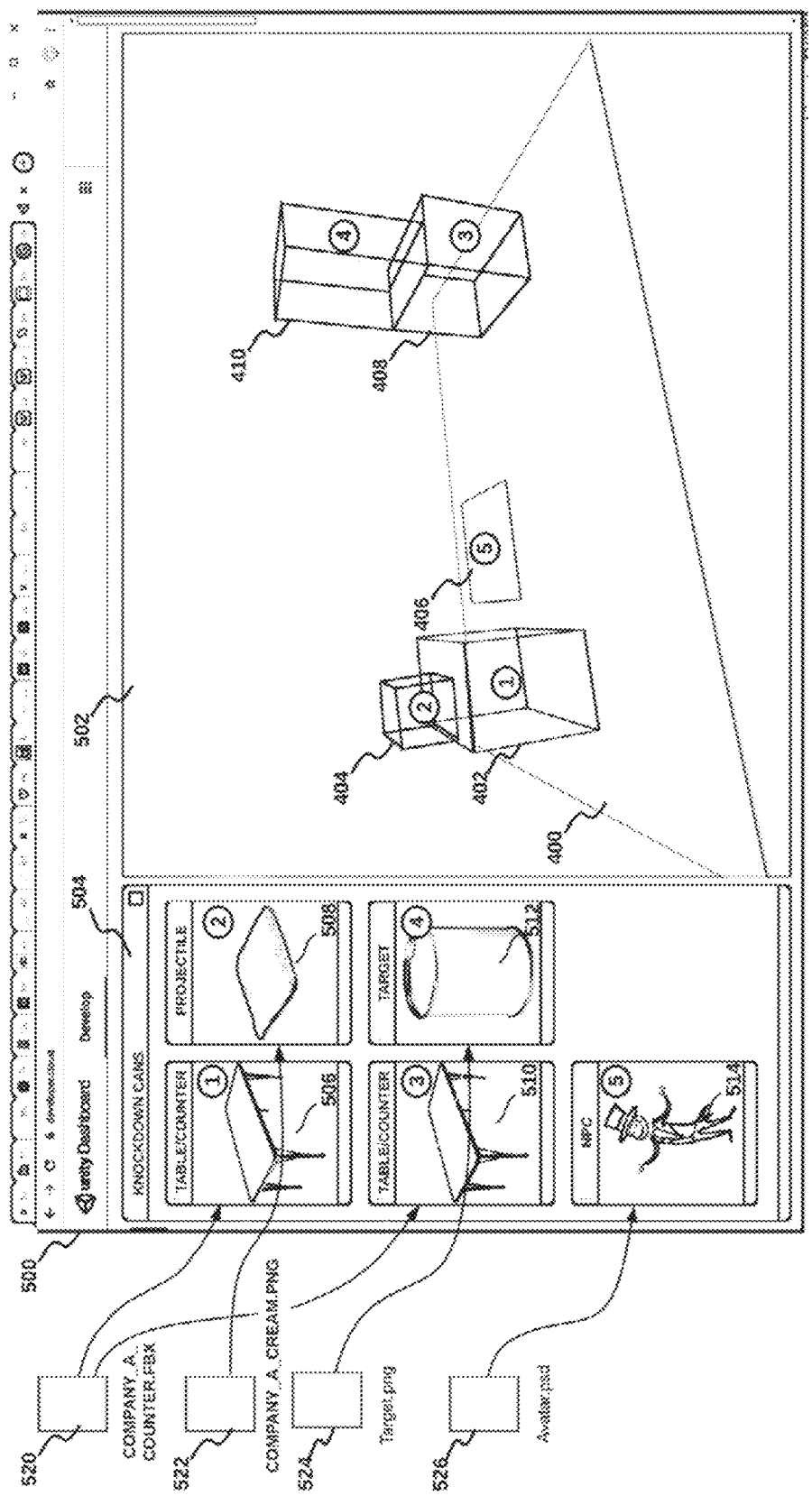
FIG. 5 is a schematic illustrating an example graphical user interface for creating and manipulating a smart volumetric layout, in accordance with an embodiment.

In accordance with an embodiment, at operation 206, the smart volumetric layout module 124 receives one or more digital objects in one or more smart volumetric shapes in the smart volumetric layout. For example, this may be from a user interacting with a UI to drag and drop a digital object into a smart volumetric shape. In accordance with an embodiment, as part of operation 206 and as shown in FIG. 5, the smart volumetric layout module 124 provides a graphical user interface 500 for display on a display device 120, the graphical user interface 500 comprising: a first display area 502 for creating, visualizing and manipulating a smart volumetric layout object 400 (e.g., which may be similar to the smart volumetric layout object shown in FIG. 4) which includes smart volumetric shapes (e.g., 402, 404, 406, 408, and 410); and a second display area 504 which includes a plurality of digital objects provided for selection and inclusion into the smart volumetric layout 400. Tools (not specifically shown in FIG. 5) may be provided for creating and manipulating the smart volumetric shapes (e.g., 3D modeling tools) and for associating digital objects from the second display area 504 with smart volumetric shapes in the first display area 502. In accordance with the example shown in FIG. 5, the second display area 504 provides functions to import, display, select and associate digital objects with smart volumetric shapes displayed in the first display area 502. In accordance with an embodiment, the first display area 502 and the second display area 504 may include a visual signal which depicts an association between a digital object displayed in the second display area 504 with a smart volumetric shape in the first display area 502. The visual signal may include colors and labels. For example, as shown in FIG. 5, a first table object 506 is associated with a first smart volumetric shape 402 wherein both are labeled with '1', a projectile 508 (e.g., a bean bag) is associated with a second smart volumetric shape 404 wherein both are labeled with '2', a second table object 510 is associated with a third smart volumetric shape 408 wherein both are labeled with '3', a target object 512 (e.g., a can) is associated with a fourth smart volumetric shape 410 wherein both are labeled with '4', and a non-playable character (NPC) object 514 is associated with a fifth smart volumetric shape 406 wherein both are labeled with '5'. In accordance with an embodiment, the first display area 502 may integrate camera data (e.g., from a camera device 114) that describes an environment, wherein the environment may be an environment surrounding the smart volumetric layout device 104. The integrated camera data may provide a view of the environment whereby the tools for creating and manipulating the smart volumetric shapes may also be used to associate the smart volumetric shapes (or the smart volumetric layout object 400) with elements of the environment (e.g., associating the smart volumetric layout object with a real-world environment).

In accordance with the example shown in FIG. 5, the second display area 504 may show a preview image (e.g., thumbnail) of a digital object which it represents, wherein the digital object may be described by data in a memory (e.g., within a file). The digital objects displayed within the second display area 504 may be imported within digital files of any content format (e.g., image file formats (JPEG, PNG, GIF, and the like), and 3D model and animation file formats (e.g., FBX, PSD, and the like), and sound file formats (e.g., WAV, MPEG, and the like), and more). For example, the first table 506 and the second table 510 may be described in a FBX format file 520 ('Company_A_Counter.FBX'), the projectile object 508 may be described an image file 522 ('Company_A_Cream.PNG'), the target object 512 may be described in an image file 524 ('Targe.PNG'), and the NPC object 514 may be described in a PSD file 526 ('Avatar.PSD').

Returning to FIG. 2, in accordance with an embodiment, in operation 208 of the method 200, for each volumetric shape, the properties and behaviors associated with the volumetric shape are applied to the one or more digital objects placed therein. For example, the smart volumetric layout module 124 may deform, reorient, and resize a digital object to fit within the smart volumetric shape (e.g., according to the instructions associated with the smart volumetric shape provided in operation 202), and the smart volumetric layout module 124 may also add behaviors (e.g., adding physics) to the digital object (e.g., according to the instructions associated with the smart volumetric shape provided in operation 202). For example, referring to the example shown in FIG. 5 which shows an example of a smart volumetric layout for a knockdown can game (e.g., a game wherein a projectile is thrown at a target), the projectile digital object 508 (e.g., a bean bag) placed in the second smart volumetric shape 404 may inherit physics behaviors associated with a projectile object, wherein the physics behaviors were associated with the second smart volumetric shape 404 during operation 222. For example, the inherited physics properties may include a collider for initiating collisions with other objects, an ability to be affected by forces such as gravity and interactions with other digital objects, and an ability to accelerate correctly according to an applied force. Similarly, the first table digital object 506 placed within the first smart volumetric shape 402, and the second table digital object 510 placed within the third volumetric shape 408 may inherit properties from their respective smart volumetric shapes. For example, they may be resized and oriented to fit in their associated smart volumetric shapes 402 and 408 respectively. Furthermore, the target digital object 512 (e.g., a can) placed within the fourth smart volumetric shape 410 may also inherit physics properties associated with a target, wherein the physics behaviors were associated with the fourth smart volumetric shape 410 during operation 222. The inherited physics properties may include a collider for initiating collisions with other objects, an ability to be affected by forces such as gravity and interactions from other digital objects, and an ability to accelerate correctly according to the applied force.

In accordance with an embodiment, as part of operation 208, based on an absence of instructions within a smart volumetric shape, the smart volumetric layout module 124 determines a default behavior to apply. For example, based on a WAV sound file being placed in a smart volumetric shape which has no specific sound playing instructions (e.g., as provided in operation 202), the smart volumetric layout module 124 will play the WAV sound file by default (e.g., using a sound playback module). However, based on the smart volumetric shape including specific instructions (e.g., to trigger a playing of the WAV file based on a proximity trigger), the WAV file will play only when the proximity trigger is triggered.

In accordance with an embodiment, and referring to FIG. 2, at operation 210 of the method 200, the smart volumetric layout module 124 may package (e.g., based on a command received by the GUI 500) the smart volumetric shapes, the digital objects therein, the associated properties and behaviors created in the GUI 500 into a runtime executable application (e.g., a mobile phone application, a mixed reality application, and the like). The runtime executable application may be distributed and executed on other computational devices (e.g., mobile phones, HMD virtual reality devices, HMD augmented reality devices, and the like) as described below in operation 212.

Figure 6C:
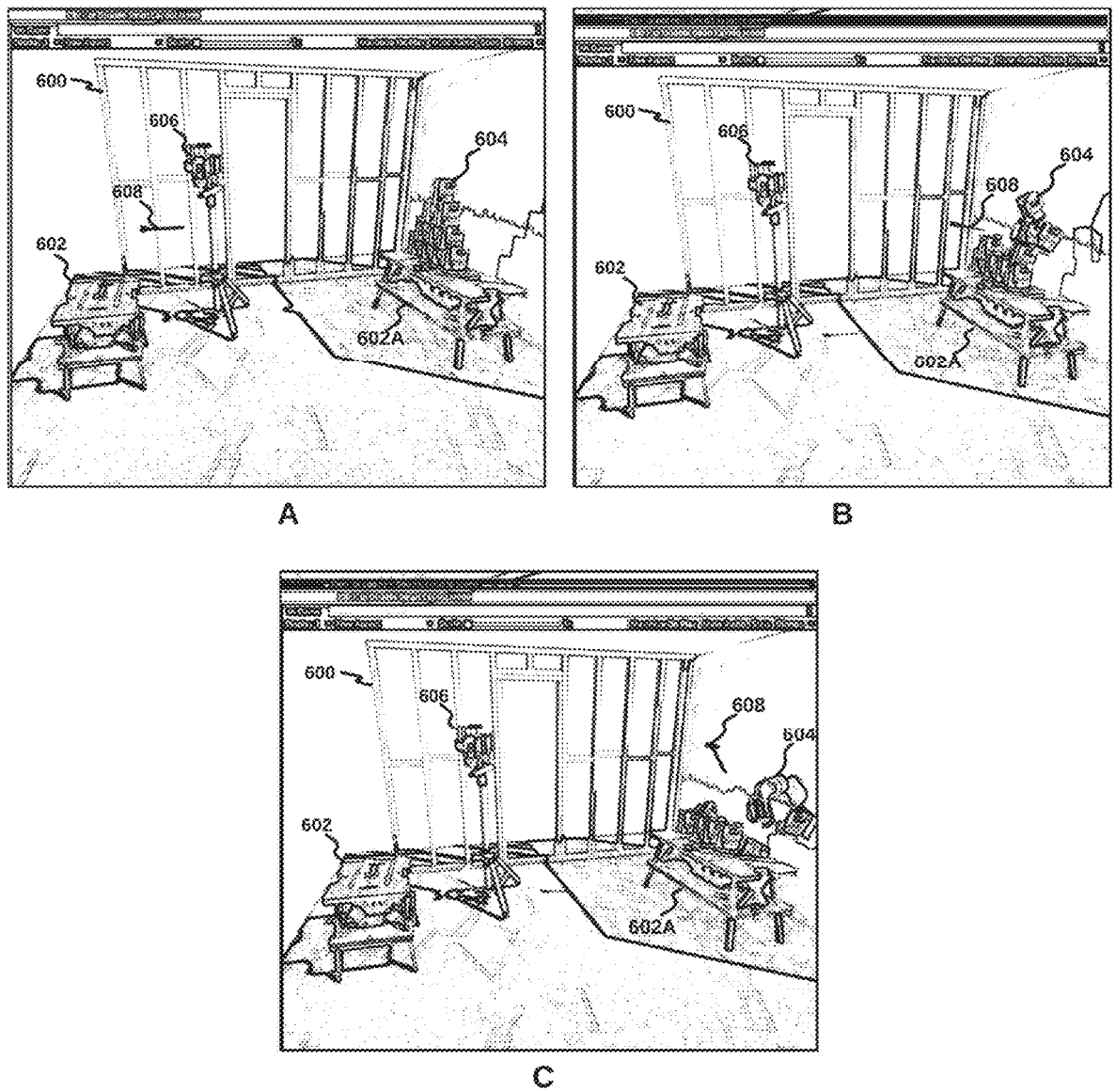
FIG. 6C is a series of three schematic diagrams illustrating an execution of an application that includes a smart volumetric layout, in accordance with an embodiment.

In accordance with an embodiment, at operation 212 of the method 200, during an execution of the runtime executable application created in operation 210, objects within a volumetric shape expose the properties and behaviors (e.g., visual appearance and physics behaviors) associated with the volumetric shape. The execution may be on a mobile device similar to the smart volumetric layout device 104 shown in FIG. 1A and FIG. 1B. In accordance with an embodiment, examples of operation 212 are shown in FIG. 6C, FIG. 7C, and FIG. 8D.

In accordance with an embodiment, based on a creation of a smart volumetric layout (e.g., in operation 202), a plurality of digital objects can be swapped, exchanged and modified (e.g., in operation 206 and 208) to fit a plurality of applications (e.g., including traditional video games, mixed reality applications, and more) without a manual creation of programming code. For example, a smart volumetric layout for in-store marketing can be created a single time (e.g., during operation 202), and the created smart volumetric layout can be deployed in a plurality of different brick and mortar stores with content specific to each store added (e.g., in operation 206) by an employee of each store (e.g., as described in FIG. 7A, FIG. 7B, and FIG. 7C).

In various embodiments, some of the method elements for the method 200 shown in FIG. 2 and FIG. 3 may be performed concurrently, in a different order than shown, or may be omitted.

Figure 6A:
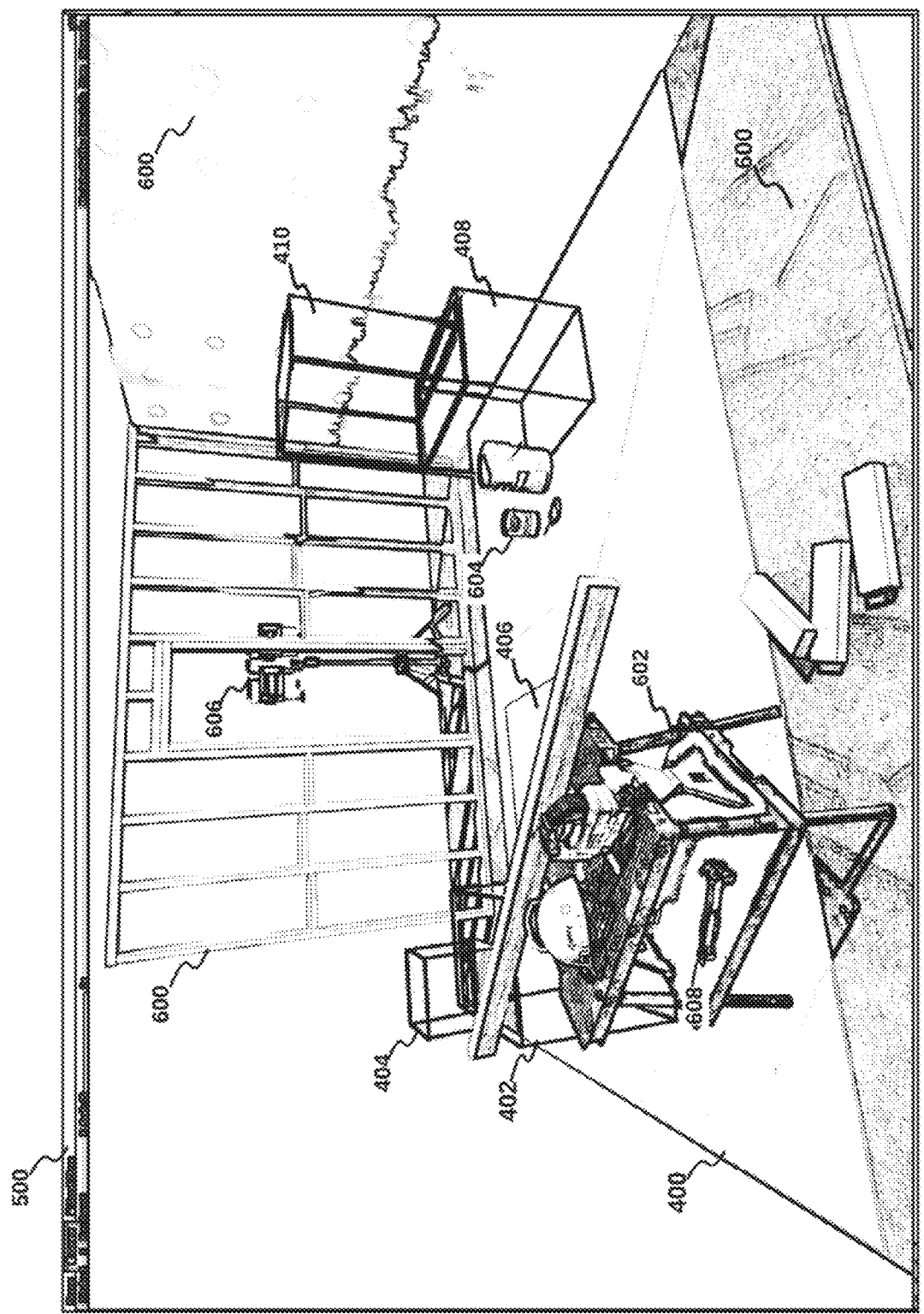
FIG. 6A is a schematic illustrating an example graphical user interface that includes a smart volumetric layout in addition to a 3D digital scene, in accordance with an embodiment.

In accordance with an embodiment, as an example of the method 200 (e.g., described in FIG. 2 and FIG. 3), FIG. 6A shows the GUI 500 wherein a smart volumetric layout 400 along with a 3D scene 600 (e.g., a construction site) are manipulated (e.g., by a user interacting with the GUI 500) to create a simple game. In accordance with an embodiment, FIG. 6A may be an illustration of operation 204 wherein the smart volumetric layout 400, which may have been previously created (e.g., and packaged in a file), is imported and displayed within an application (e.g., within a content creation application). For the purposes of an example, the application may be used to create a game, wherein the game may be a knockdown game similar to the game described with respect to FIG. 5. Furthermore, in accordance with an embodiment, the smart volumetric layout 400 may be similar to the smart volumetric layout 400 shown in FIG. 4 and FIG. 5, and wherein smart volumetric shapes (e.g., 402, 404, 406, 408, and 410) within the smart volumetric layout 400 have been assigned properties and behaviors (e.g., as shown and described with respect to FIG. 5 and according to operation 206). In addition, as shown in FIG. 6A, the smart volumetric layout 400 may be aligned with the scene 600 (e.g., using 3D digital manipulation tools provided within the GUI 500), wherein the scene 600 includes several digital objects such as a workbench 602, a can of paint 604, a large light stand 606, and a hammer 608 (each of the digital objects may have been created in a 3D content creation application and be described within a 3D content file or 3D content data format (e.g., FBX, OBJ, STL or the like)).

Figure 6B:
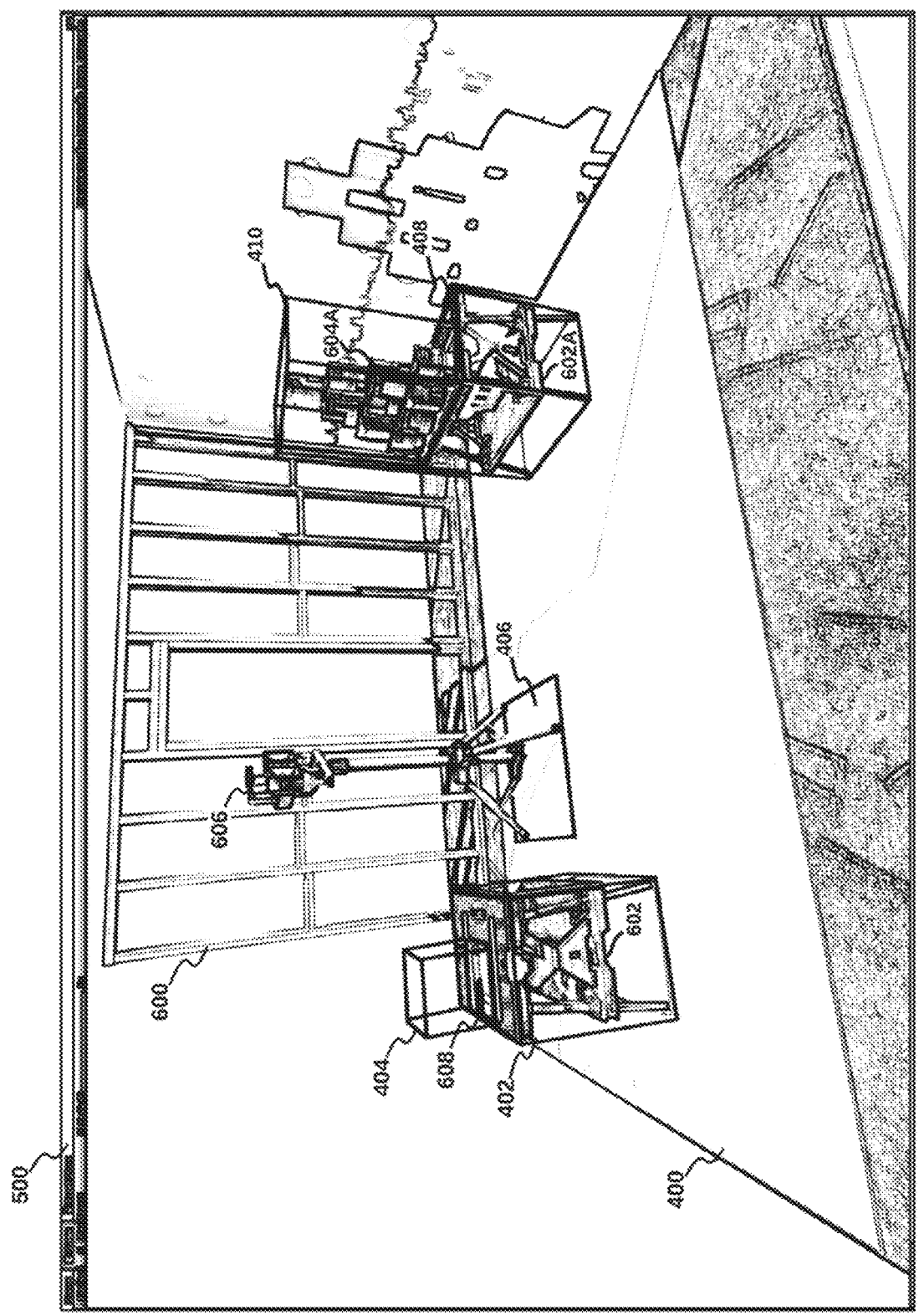
FIG. 6B is a schematic illustrating an example graphical user interface that includes a smart volumetric layout in addition to a 3D digital scene, in accordance with an embodiment.

In accordance with an embodiment and continuing the example from FIG. 6A, shown in FIG. 6B is a result of operation 206 and 208, wherein a user may use tools within the GUI 500 (tools not shown in FIG. 6A or FIG. 6B) to place the digital objects (e.g., 602, 604, 606, and 608) from the scene 600 into the smart volumetric shapes (e.g., 402, 404, 406, 408, and 410) in the smart volumetric layout 400. For example, the workbench digital object 602 is within the first volumetric shape 402 (e.g., after being placed therein by a user interacting with the GUI 500 as part of operation 206), and according to operation 208 inherits properties and behaviors associated with the first volumetric shape 402 (e.g., wherein the properties and behaviors may have been associated with the first volumetric shape 402 during operation 202). For example, the workbench digital object 602 is automatically oriented and sized in a way determined by the associated properties and behaviors of the first volumetric shape 402 (for example resizing of the workbench 602 to fill a volume within the first volumetric shape 402 and reorienting the workbench as shown in FIG. 6B). Continuing with the example, a digital copy workbench digital object 602A is within the third volumetric shape 408 (e.g., after being placed therein by a user interacting with the GUI 500 as part of operation 206), and according to operation 208 inherits properties and behaviors associated with the third volumetric shape 408 (e.g., wherein the properties and behaviors may have been associated with the third volumetric shape 408 during operation 202). For example, the digital copy workbench digital object 602A is automatically oriented and sized in a way determined by the associated properties and behaviors associated with the third volumetric shape 408 (for example resizing of the workbench 602A to fill a volume within the third volumetric shape 408 and reorienting the workbench as shown in FIG. 6B). Continuing with the example, the hammer digital object 608 is within the second volumetric shape 404 (e.g., after being placed therein by a user interacting with the GUI 500 as part of operation 206), and according to operation 208 inherits properties and behaviors associated with the second volumetric shape 404 (e.g., wherein the properties and behaviors may have been associated with the second volumetric shape 404 during operation 202). For example, the hammer digital object 608 is oriented, sized, and given behaviors based on the associated properties and behaviors of the second volumetric shape 404 (for example reorienting the hammer 608 as shown in FIG. 6B, and providing the hammer 608 with physics properties that allow it to behave as a projectile object). Continuing with the example, the can of paint digital object 604 is within the fourth volumetric shape 410 (e.g., after being placed therein by a user interacting with the GUI 500 as part of operation 206), and according to operation 208 inherits properties and behaviors associated with the fourth volumetric shape 410 (e.g., wherein the properties and behaviors may have been associated with the fourth volumetric shape 410 during operation 202). For example, the can of paint digital object 604 is automatically sized, duplicated, oriented, and given behaviors based on the associated properties and behaviors of the fourth volumetric shape 410 (for example resizing and duplicating of the can of paint 604 to create a pyramid of paint cans 604A that fill the volume within the fourth volumetric shape 410 as shown in FIG. 6B, as well as being given physics properties that allow each can of paint 604 within the pyramid of paint cans 604A to behave as a target object). Continuing with the example, the large light digital object 606 is within the fifth volumetric shape 406 (e.g., after being placed therein by a user interacting with the GUI 500 as part of operation 206), and according to operation 208 inherits properties and behaviors associated with the fifth volumetric shape 406 (e.g., wherein the properties and behaviors may have been associated with the fifth volumetric shape 406 during operation 202). For example, the large light digital object 606 is automatically sized, and oriented based on the properties and behaviors associated with the fifth volumetric shape 406 (for example resizing and orienting the large light digital object 606 as shown in FIG. 6B).

In accordance with an embodiment, and shown in FIG. 6C is a continuation of the examples shown in FIG. 6A and FIG. 6B, and is an illustration of operation 212. In accordance with an embodiment, FIG. 6C has three panels labeled 'A', 'B', and 'C' which depict a time sequence of an execution of an application created as shown in FIG. 6A and FIG. 6B, and packaged into an executable application according to operation 210. For example, the three panels ('A', 'B', and 'C') may illustrate a playing of a game application being executed on a mobile device. The three panels show the hammer digital object 608 being projected from the first workbench 602 (e.g., shown in panel 'A') across the scene 600 to hit and displace the paint cans 604A on the second workbench 602A (e.g., shown in panels 'B' and 'C'). In accordance with an embodiment, panels 'B' and 'C' illustrate the effects of the hammer 608 hitting and displacing the paint cans 604 based on the physics properties assigned to both in operation 208 via the smart volumetric shapes (e.g., wherein the smart volumetric shapes received the physics properties during operation 202).

Figure 7A:
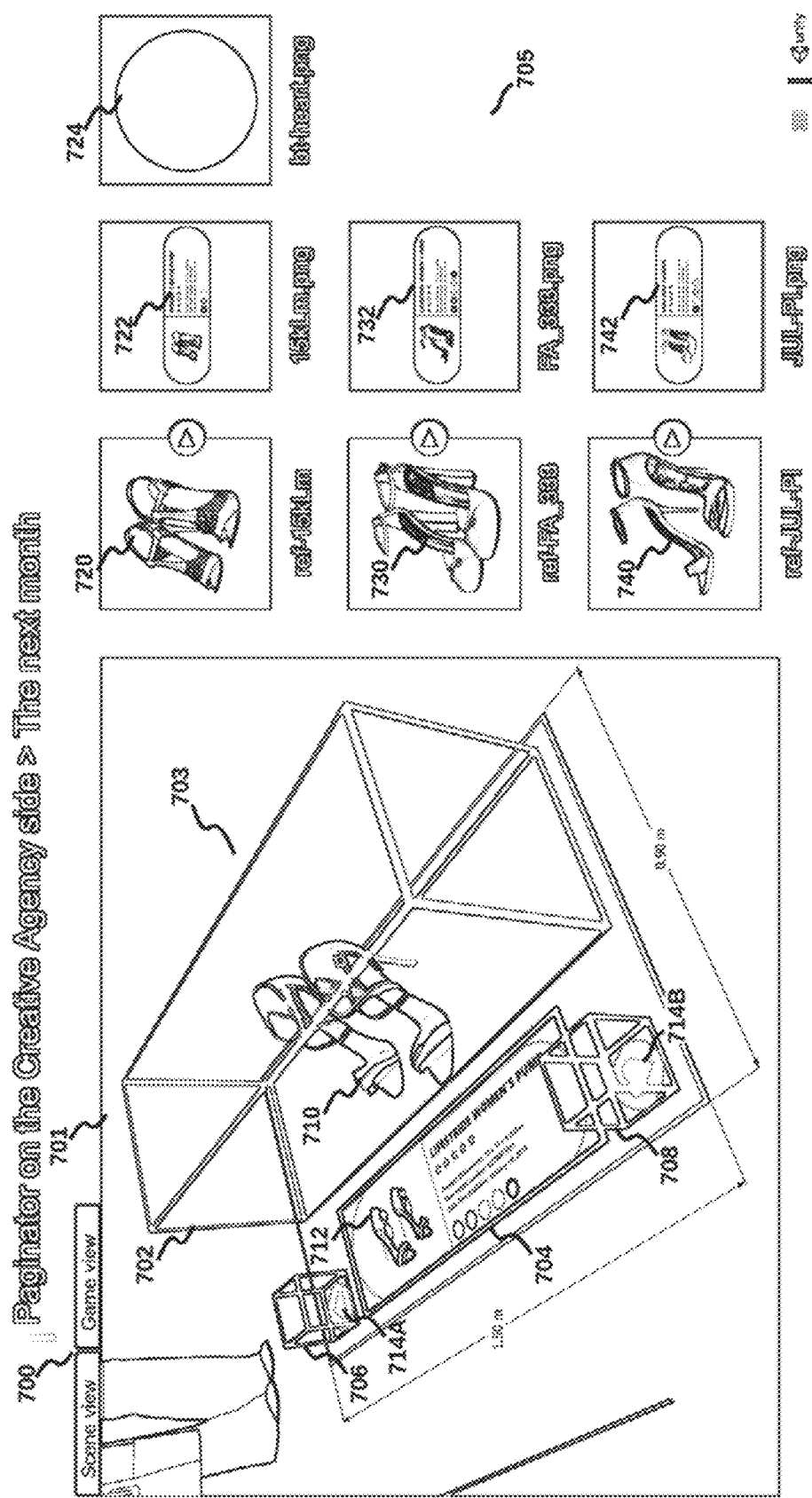
FIG. 7A is a schematic illustrating an example graphical user interface for creating and manipulating a smart volumetric layout, in accordance with an embodiment.

In accordance with an embodiment, FIG. 7A is an illustration of an example GUI 700 performing operation 206 (e.g., similar to the GUI 500 shown in FIG. 5), wherein digital objects are associated with properties and behaviors that are associated with smart volumetric shapes in order to create a display application for a shoe store (e.g., an augmented-reality or mixed-reality display application for mobile devices). In accordance with an embodiment, FIG. 7A illustrates a GUI 700 with a first display area 701 that includes a smart volumetric layout 703 (e.g., for creating, visualizing and manipulating the smart volumetric layout object 703), wherein the smart volumetric layout 703 includes smart volumetric shapes (e.g., 702, 704, 706, and 708), along with a second display area 705 that includes a plurality of digital objects (720, 722, 724, 730, 732, 740, and 742) provided for selection and inclusion into the smart volumetric layout 703. Tools (not specifically shown in FIG. 7A) may be provided within the GUI 700 for creating and manipulating (e.g., sizing, moving, adding behaviors, and more) the smart volumetric shapes (e.g., 702, 704, 706, and 708) and for associating digital objects (720, 722, 724, 730, 732, 740, and 742) from the second display area 705 with smart volumetric shapes (e.g., 702, 704, 706, and 708) in the first display area 701. In accordance with an embodiment, as part of operation 206, a user may use the tools to create the display application by choosing 3D model content from the second display area 705 (e.g., 3D models of shoes) for display within the smart volumetric layout 703 and may additionally use the tools to create a control behavior (e.g., scroll buttons 714A and 714B) for scrolling through different displays of shoes. For example, a user may add a first pair of shoes 710 in the first smart volumetric shape 702 and a first display menu 712 in a second smart volumetric shape 704. Furthermore, the user may add a plurality of additional pairs of shoes (e.g., a second pair 720, a third pair 730, and a fourth pair 740) and associated additional display menus (722, 732, and 742) to replace the first pair of shoes 710 and first display menu 712 in the first smart volumetric shape 702 and second smart volumetric shape 704 upon a triggering of a scroll button (e.g., 714A and 714B). During execution of the display application (e.g., on a mobile device), the display menu 712 might be used to display information about a displayed pair of shoes 710 in the first volumetric shape 702 and may also be interactive based on the scroll buttons (e.g., by changing a displayed pair of shoes and display menu). In accordance with an embodiment, the first display area 701 in FIG. 7A may be similar to the first display area 502 in FIG. 5, and the second display area 705 in FIG. 7A may be similar to the second display area 504 in FIG. 5.

Figure 7B:
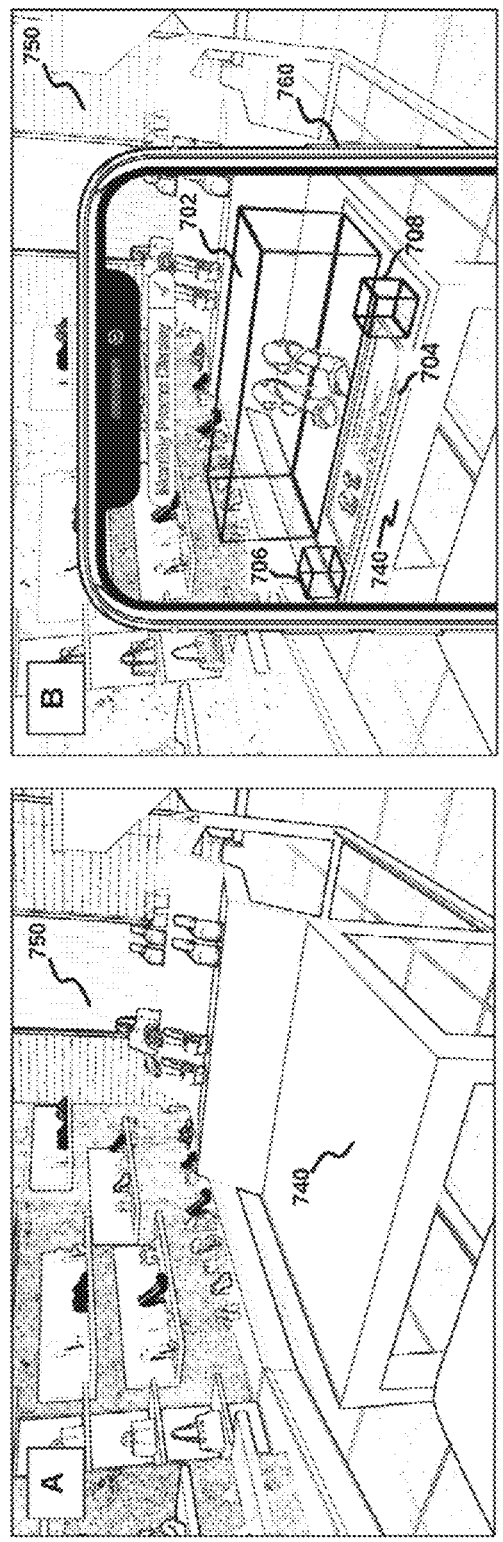
FIG. 7B is a series of three schematic diagrams illustrating an execution of an application that includes a smart volumetric layout, in accordance with an embodiment.
Figure 7C:
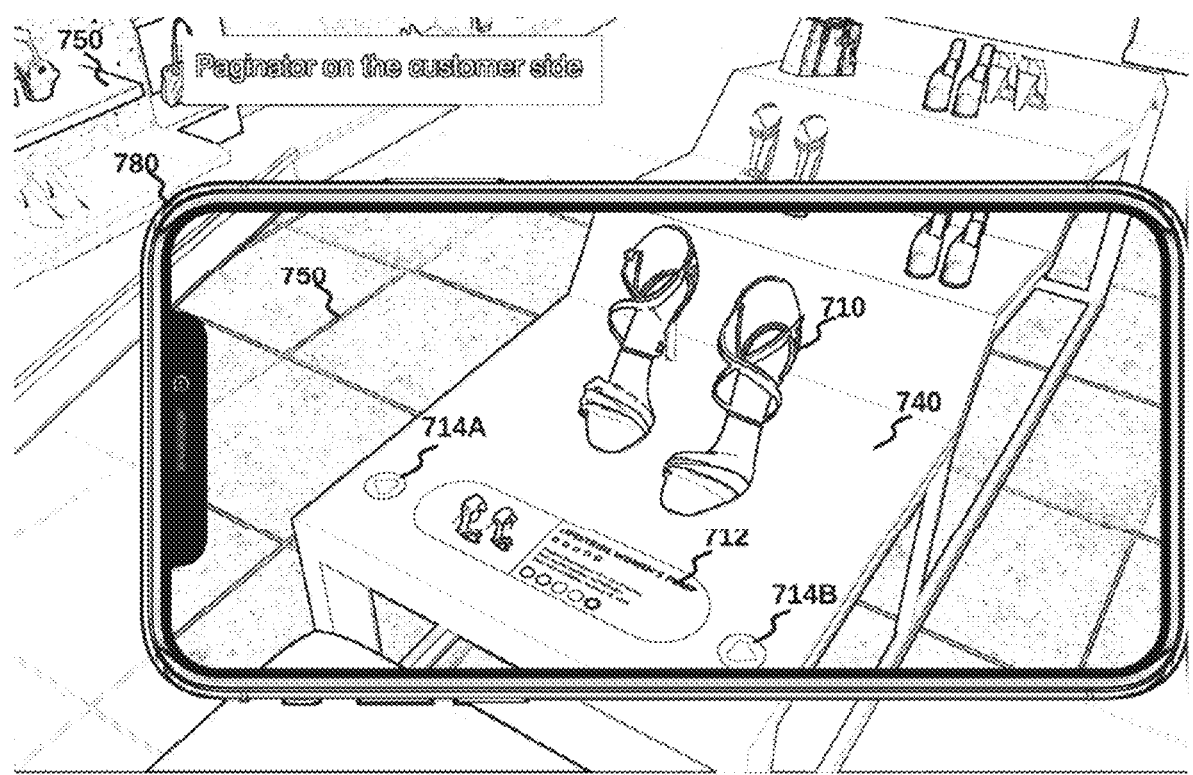
FIG. 7C is a schematic diagram illustrating an execution of an application that includes a smart volumetric layout, in accordance with an embodiment.

In accordance with an embodiment, FIG. 7B shows three panels labeled 'A', 'B', and 'C' illustrating a process for adding and manipulating a smart volumetric layout within a real-world environment (e.g., using augmented reality anchors) with a mixed reality application (e.g., the mixed reality application discussed with respect to FIG. 7A). The process may be part of operation 212 of the method 200. Panel 'A' is an illustration showing an inside view of a real-life (e.g., brick and mortar) shoe store 750 that includes a plurality of shoes on shelves as well as an empty stand 740 (e.g., a real-life shoe display stand). Panel 'B' is an illustration showing a view of the store 750 via a screen (e.g., in a passthrough mode) of a mobile phone 760 running an application created in operation 210 that includes the smart volumetric layout 703 shown and described with respect to FIG. 7A. The mobile phone 760 may be a smart volumetric layout device 104 as shown in FIG. 1A and FIG. 1B. The application may have tools (not shown) for placing and manipulating the smart volumetric layout 703 in the view of the store 750 within the mobile device display (e.g., placing the smart volumetric layout 703 on the stand 740). For example, Panel shows a user 770 manipulating a size of the first smart volumetric shape 702 (e.g., and the shoes therein) within the smart volumetric layout 703 on the display of the mobile device 760 via a drag icon 772.

In accordance with an embodiment, as part of operation 212, and as shown in FIG. 7C is an illustration of an end-user mobile device 780 viewing the store 750 within an application and triggering a display of the smart volumetric layout that was created in FIG. 7A and FIG. 7B. The end-user mobile device 780 may be a mobile device of a customer within the store 750. As shown in FIG. 7C, from the end-user perspective only the content (shoes 710, menu 704, and controls 714A and 714B) within the smart volumetric shapes is visible and interactive.

Figure 8A:
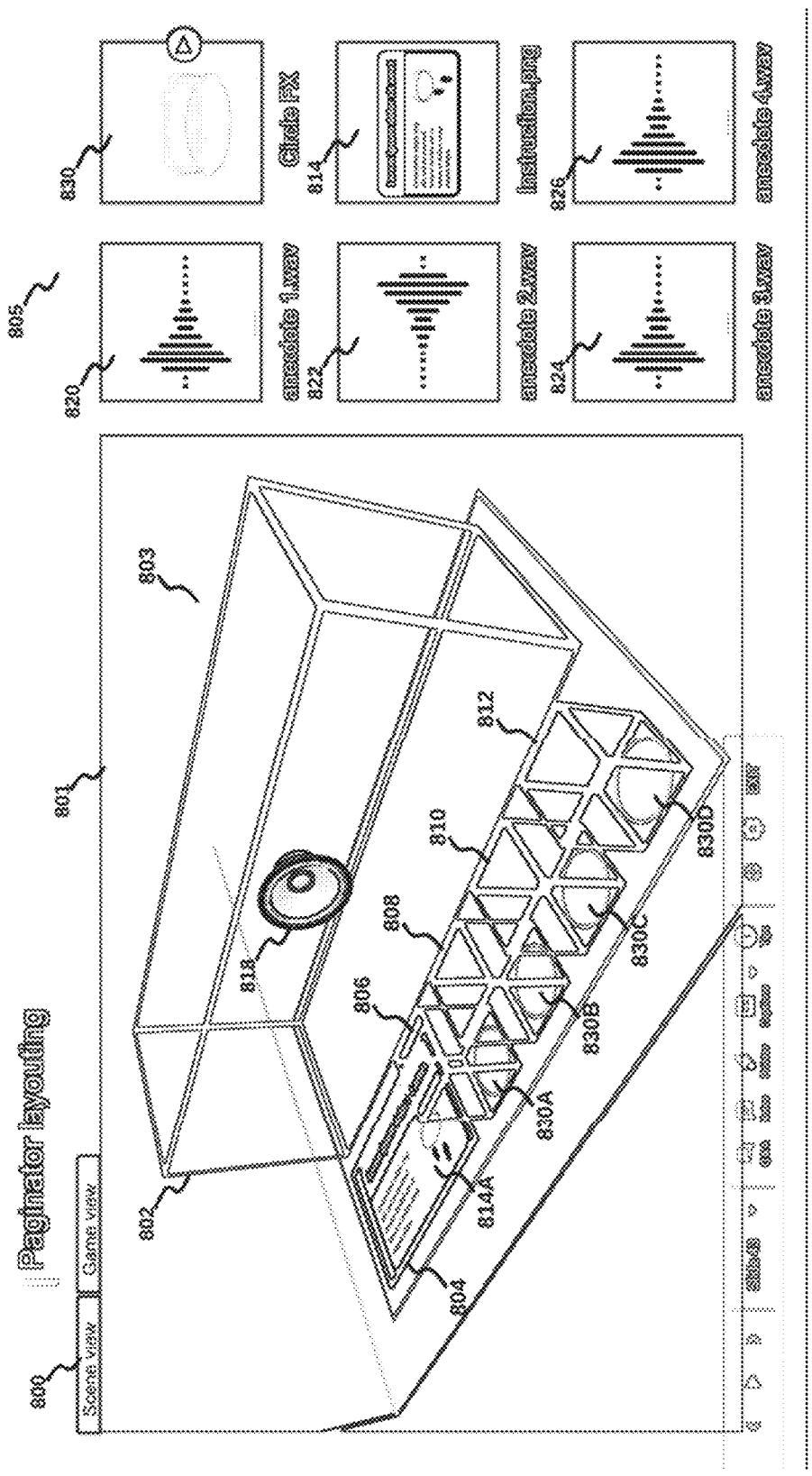
FIG. 8A is a schematic illustrating an example graphical user interface for creating and manipulating a smart volumetric layout, in accordance with an embodiment.

In accordance with an embodiment, FIG. 8A is an illustration of an example GUI 800 performing operation 206 (e.g., similar to the GUI 500 shown in FIG. 5 and the GUI 700 shown in FIG. 7A) for associating properties and behaviors to smart volumetric shapes in order to create a display application for a museum. In accordance with an embodiment, FIG. 8A illustrates a GUI 800 with a first display area 801 for creating, visualizing and manipulating a smart volumetric layout object 803 which includes smart volumetric shapes (e.g., 802, 804, 806, 808, 810 and 812), along with a second display area 805 that includes a plurality of digital objects (820, 822, 824, 826, 814 and 830) provided for selection and inclusion into the smart volumetric layout 803. Tools (not specifically shown in FIG. 8A) may be provided for creating and manipulating (e.g., sizing, moving, adding behaviors, and more) the smart volumetric shapes (e.g., 802, 804, 806, 808, 810 and 812) and for associating digital objects (820, 822, 824, 826, 814 and 830) from the second display area 805 with the smart volumetric shapes (e.g., 802, 804, 806, 808, 810 and 812) in the first display area 801. In accordance with an embodiment, as part of operation 206, a user may use the tools to create the display application by choosing 3D model content (e.g., made available within the second display area 805) for display within the smart volumetric layout 803 (e.g., 3D visual effects 830) and sound files (e.g., 820, 822, 824, and 826). For example, a user may associate the circle visual effect 830 (e.g., shown as 830A, 830B, 830C, and 830D) with a plurality of smart volumetric shapes (806, 808, 810, and 812 respectively). The user may also associate a sound player behavior with a smart volumetric shape 802 (e.g., shown in FIG. 8A, FIG. 8B, and FIG. 8C as a digital speaker 818). In addition, the user may associate a specific sound file (e.g., 820, 822, 824, and 826) with each smart volumetric shape (806, 808, 810, and 812 respectively), wherein the smart volumetric shape includes a sound player behavior which triggers the sound player behavior (e.g., digital speaker 818) within the smart volumetric shape 802. In accordance with an embodiment, the first display area 801 in FIG. 8A may be similar to the first display area 502 in FIG. 5 and the first display area 701 in FIG. 7A. Similarly, the second display area 805 in FIG. 8A may be similar to the second display area 504 in FIG. 5 and the second display area 705 in FIG. 7A.

Figure 8B:
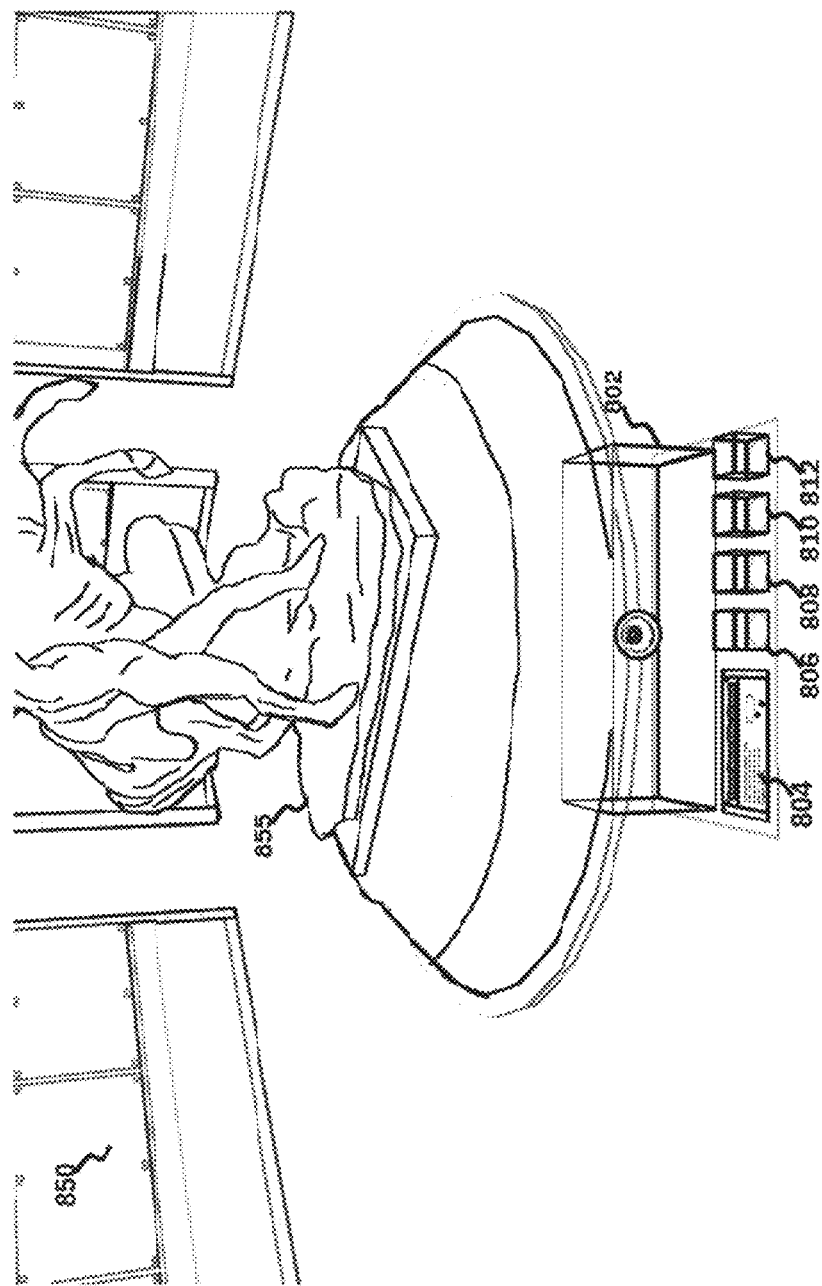
FIG. 8B is a schematic diagram illustrating an execution of an application that includes a smart volumetric layout, in accordance with an embodiment.
Figure 8C:
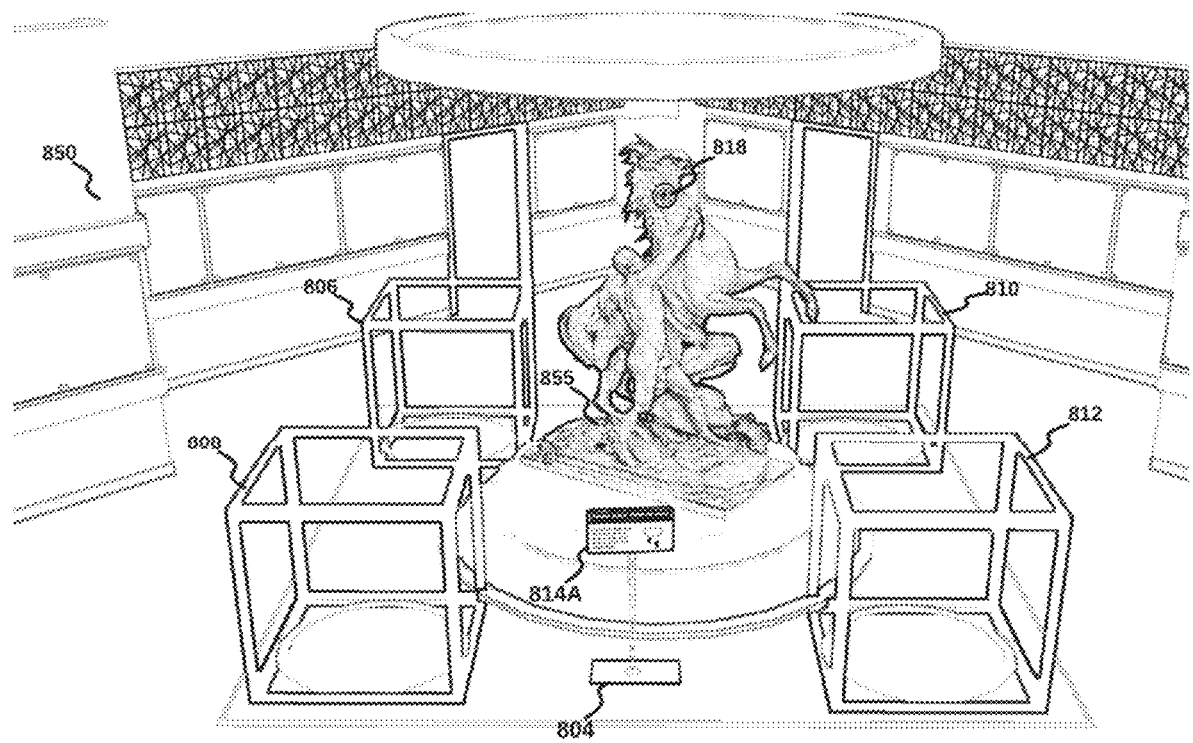
FIG. 8C is a schematic diagram illustrating an execution of an application that includes a smart volumetric layout, in accordance with an embodiment.
Figure 8D:
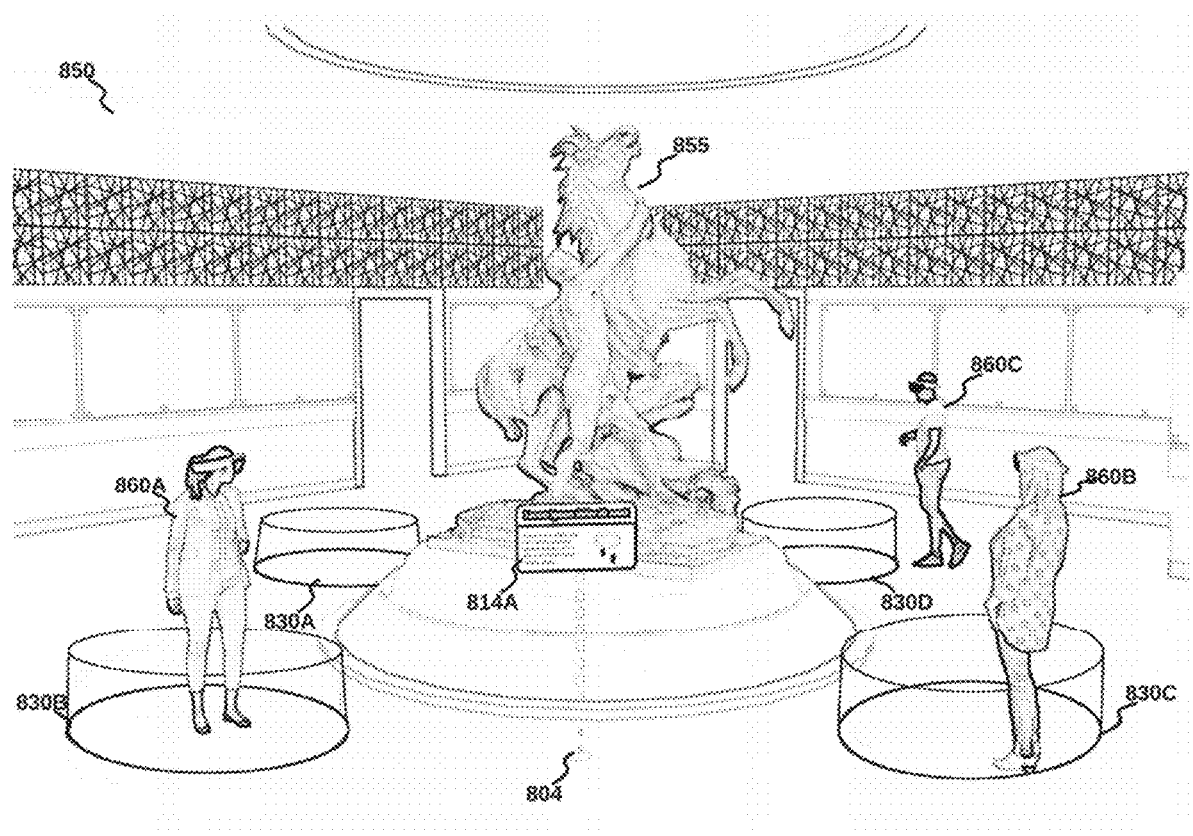
FIG. 8D is a schematic diagram illustrating an execution of an application that includes a smart volumetric layout, in accordance with an embodiment.

Continuing the example from FIG. 8A, the illustrations in FIG. 8B and FIG. 8C show aspects of operation 212 wherein the smart volumetric layout 803 created in the GUI 800 shown in FIG. 8A is deployed within a museum. The deployment may be via an application on a mobile device (e.g., a mobile phone acting as a smart volumetric layout device 104) or an HMD device (e.g., as shown in FIG. 1B) capable of a mixed reality display. In accordance with an embodiment, the view shown in FIG. 8B and FIG. 8C may be a view through a display device 120 and/or visor 160. In accordance with an embodiment, and as shown in FIG. 8C, the smart volumetric shapes 804, 806, 808, 810 and 812 may be manipulated (e.g., moved and resized) as part of operation 212 in order to better occupy a space within the museum (e.g., enlarged and displaced in a symmetric layout as shown). In accordance with an embodiment, FIG. 8D illustrates what end-users (e.g., 860A, 860B, and 860C) might experience (e.g., see and hear) when a final application is running (e.g., executing on a smart volumetric layout device 104) and they are experiencing the application via HMDs (e.g., similar to the HMD in FIG. 1B).

While illustrated in the block diagrams as groups of discrete components communicating with each other via distinct data signal connections, it will be understood by those skilled in the art that the various embodiments may be provided by a combination of hardware and software components, with some components being implemented by a given function or operation of a hardware or software system, and many of the data paths illustrated being implemented by data communication within a computer application or operating system. The structure illustrated is thus provided for efficiency of teaching the present various embodiments.

It should be noted that the present disclosure can be carried out as a method, can be embodied in a system, a computer readable medium or an electrical or electro-magnetic signal. The embodiments described above and illustrated in the accompanying drawings are intended to be exemplary only. It will be evident to those skilled in the art that modifications may be made without departing from this disclosure. Such modifications are considered as possible variants and lie within the scope of the disclosure.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by specialized software (e.g., an application or application portion) as a hardware module that operates to perform one or more of the operations described herein.

In some embodiments, a hardware module may be implemented mechanically, electronically, or with any suitable combination thereof. For example, a hardware module may include dedicated circuitry or logic that is permanently configured to perform certain operations. For example, a hardware module may be a special-purpose processor, such as a field-programmable gate array (FPGA) or an Application Specific Integrated Circuit (ASIC). A hardware module may also include programmable logic or circuitry that is temporarily configured by software to perform certain operations. For example, a hardware module may include specialized software encompassed within a general-purpose processor or other programmable processor. Such software may at least temporarily transform the general-purpose processor into a special-purpose processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by specialized software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by specialized software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (Saas). For example, at least some of the operations may be performed by a group of computers (as examples of machines including processors), with these operations being accessible via a network (e.g., the Internet)

and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Figure 9:
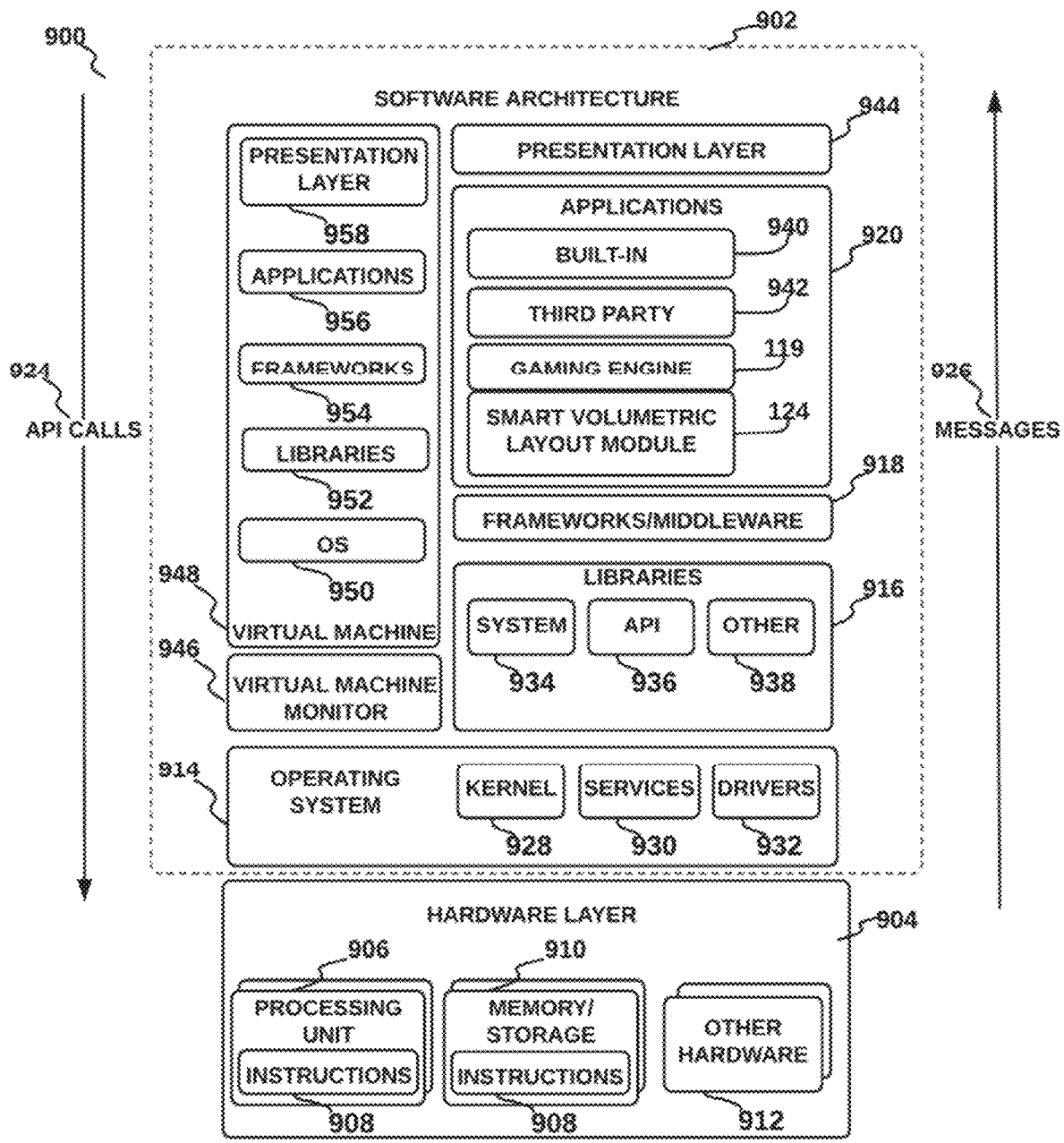
FIG. 9 is a block diagram illustrating an example software architecture, which may be used in conjunction with various hardware architectures described herein.

FIG. 9 is a block diagram 900 illustrating an example software architecture 902, which may be used in conjunction with various hardware architectures herein described to provide a game engine 119 and/or components of the smart volumetric layout system 100. FIG. 9 is a non-limiting example of a software architecture and it will be appreciated that many other architectures may be implemented to facilitate the functionality described herein. The software architecture 902 may execute on hardware such as a machine 1000 of FIG. 10 that includes, among other things, processors 1010, memory 1030, and input/output (I/O) components 1050. A representative hardware layer 904 is illustrated and can represent, for example, the machine 1000 of FIG. 10. The representative hardware layer 904 includes a processing unit 906 having associated executable instructions 908. The executable instructions 908 represent the executable instructions of the software architecture 902, including implementation of the methods, modules and so forth described herein. The hardware layer 904 also includes memory/storage 910, which also includes the executable instructions 908. The hardware layer 904 may also comprise other hardware 912.

In the example architecture of FIG. 9, the software architecture 902 may be conceptualized as a stack of layers where each layer provides particular functionality. For example, the software architecture 902 may include layers such as an operating system 914, libraries 916, frameworks or middleware 918, applications 920 and a presentation layer 944. Operationally, the applications 920 and/or other components within the layers may invoke application programming interface (API) calls 924 through the software stack and receive a response as messages 926. The layers illustrated are representative in nature and not all software architectures have all layers. For example, some mobile or special purpose operating systems may not provide the frameworks/middleware 918, while others may provide such a layer. Other software architectures may include additional or different layers.

The operating system 914 may manage hardware resources and provide common services. The operating system 914 may include, for example, a kernel 928, services 930, and drivers 932. The kernel 928 may act as an abstraction layer between the hardware and the other software layers. For example, the kernel 928 may be responsible for memory management, processor management (e.g., scheduling), component management, networking, security settings, and so on. The services 930 may provide other common services for the other software layers. The drivers 932 may be responsible for controlling or interfacing with the underlying hardware. For instance, the drivers 932 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 916 may provide a common infrastructure that may be used by the applications 920 and/or other components and/or layers. The libraries 916 typically provide functionality that allows other software modules to perform tasks in an easier fashion than to interface directly with the underlying operating system 914 functionality (e.g., kernel 928, services 930 and/or drivers 932). The libraries 916 may include system libraries 934 (e.g., C standard library) that may provide functions such as memory allocation functions, string manipulation functions, mathematic functions, and the like. In addition, the libraries 916 may include API libraries 936 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 916 may also include a wide variety of other libraries 938 to provide many other APIs s to the applications 920 and other software components/modules.

The frameworks 918 (also sometimes referred to as middleware) provide a higher-level common infrastructure that may be used by the applications 920 and/or other software components/modules. For example, the frameworks/middleware 918 may provide various graphic user interface (GUI) functions, high-level resource management, high-level location services, and so forth. The frameworks/middleware 918 may provide a broad spectrum of other APIs that may be utilized by the applications 920 and/or other software components/modules, some of which may be specific to a particular operating system or platform.

The applications 920 include built-in applications 940 and/or third-party applications 942. Examples of representative built-in applications 940 may include, but are not limited to, a contacts application, a browser application, a book reader application, a location application, a media application, a messaging application, and/or a game application. Third-party applications 942 may include any an application developed using the Android™ or iOS™ software development kit (SDK) by an entity other than the vendor of the particular platform, and may be mobile software running on a mobile operating system such as iOS™, Android™, Windows® Phone, or other mobile operating systems. The third-party applications 942 may invoke the API calls 924 provided by the mobile operating system such as operating system 914 to facilitate functionality described herein.

The applications 920 may use built-in operating system functions (e.g., kernel 928, services 930 and/or drivers 932), libraries 916, or frameworks/middleware 918 to create user interfaces to interact with users of the system. Alternatively, or additionally, in some systems, interactions with a user may occur through a presentation layer, such as the presentation layer 944. In these systems, the application/module "logic" can be separated from the aspects of the application/module that interact with a user.

Some software architectures use virtual machines. In the example of FIG. 9, this is illustrated by a virtual machine 948. The virtual machine 948 creates a software environment where applications/modules can execute as if they were executing on a hardware machine (such as the machine 1000 of FIG. 10, for example). The virtual machine 948 is hosted by a host operating system (e.g., operating system 914) and typically, although not always, has a virtual machine monitor 946, which manages the operation of the virtual machine 948 as well as the interface with the host operating system (i.e., operating system 914). A software architecture executes within the virtual machine 948 such as an operating system (OS) 950, libraries 952, frameworks 954, applications 956, and/or a presentation layer 958. These layers of software architecture executing within the virtual machine 948 can be the same as corresponding layers previously described or may be different.

Figure 10:
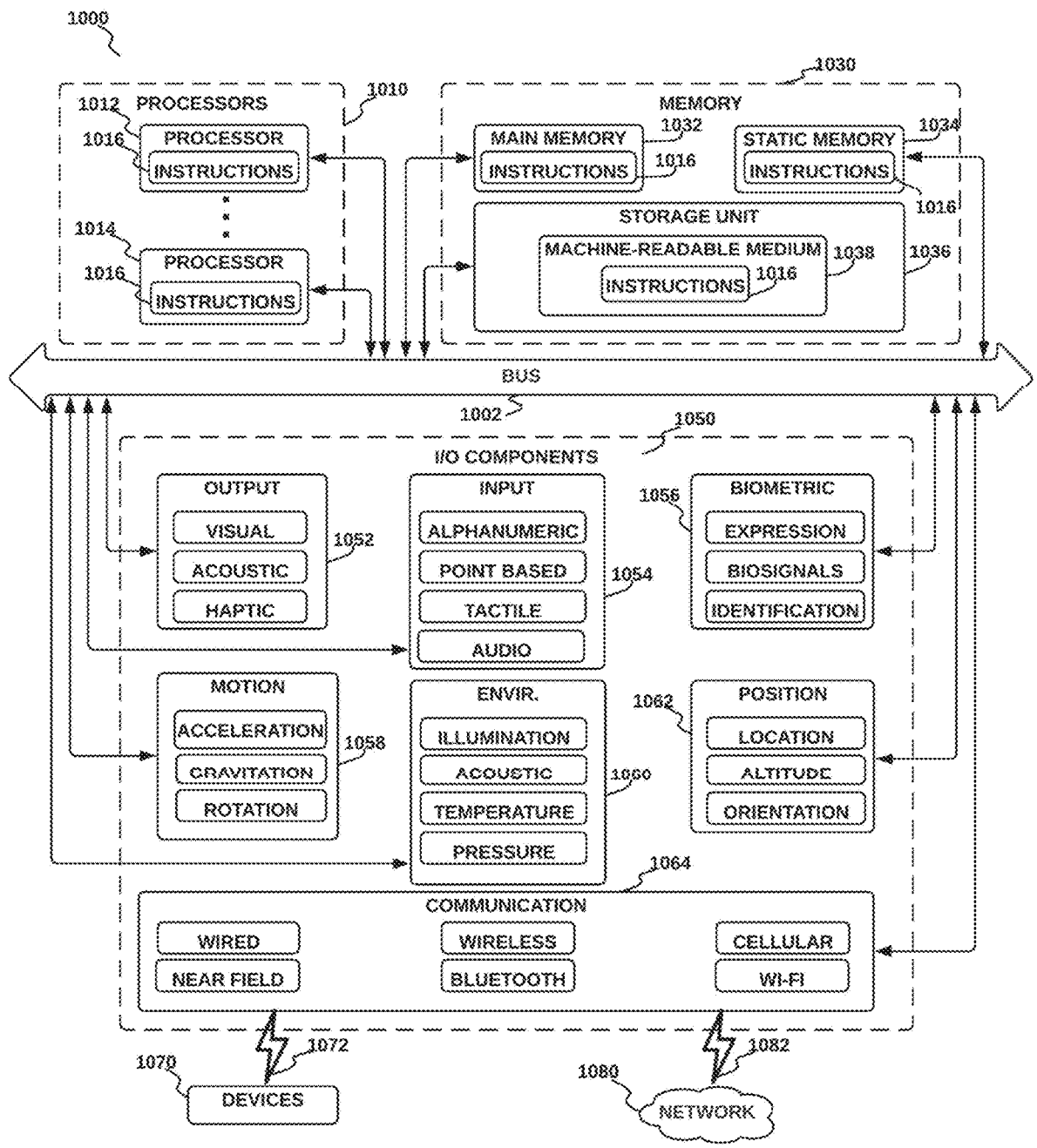
FIG. 10 is a block diagram illustrating components of a machine, according to some example embodiments, configured to read instructions from a machine-readable medium (e.g., a machine-readable storage medium) and perform any one or more of the methodologies discussed herein.

FIG. 10 is a block diagram illustrating components of a machine 1000, according to some example embodiments, configured to read instructions from a machine-readable medium (e.g., a machine-readable storage medium) and perform any one or more of the methodologies discussed herein. In some embodiments, the machine 1000 is similar to the smart volumetric layout device 104. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein may be executed. As such, the instructions 1016 may be used to implement modules or components described herein. The instructions transform the general, non-programmed machine into a particular machine programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines that individually or jointly execute the instructions 1016 to perform any one or more of the methodologies discussed herein.

The machine 1000 may include processors 1010, memory 1030, and input/output (I/O) components 1050, which may be configured to communicate with each other such as via a bus 1002. In an example embodiment, the processors 1010 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1012 and a processor 1014 that may execute the instructions 1016. The term "processor" is intended to include multi-core processor that may comprise two or more independent processors (sometimes referred to as "cores") that may execute instructions contemporaneously. Although FIG. 10 shows multiple processors, the machine 1000 may include a single processor with a single core, a single processor with multiple cores (e.g., a multi-core processor), multiple processors with a single core, multiple processors with multiples cores, or any combination thereof.

The memory/storage 1030 may include a memory, such as a main memory 1032, a static memory 1034, or other memory, and a storage unit 1036, both accessible to the processors 1010 such as via the bus 1002. The storage unit 1036 and memory 1032, 1034 store the instructions 1016 embodying any one or more of the methodologies or functions described herein. The instructions 1016 may also reside, completely or partially, within the memory 1032, 1034, within the storage unit 1036, within at least one of the processors 1010 (e.g., within the processor's cache memory), or any suitable combination thereof, during execution thereof by the machine 1000. Accordingly, the memory 1032, 1034, the storage unit 1036, and the memory of processors 1010 are examples of machine-readable media 1038.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store the instructions 1016. The term "machine-readable medium" shall also be taken to include any medium, or combination of multiple media, that is capable of storing instructions (e.g., instructions 1016) for execution by a machine (e.g., machine 1000), such that the instructions, when executed by one or more processors of the machine 1000 (e.g., processors 1010), cause the machine 1000 to perform any one or more of the methodologies or operations, including non-routine or unconventional methodologies or operations, or non-routine or unconventional combinations of methodologies or operations, described herein. Accordingly, a "machine-readable medium" refers to a single storage apparatus or device, as well as "cloud-based" storage systems or storage networks that include multiple storage apparatus or devices. The term "machine-readable medium" excludes signals per se.

The input/output (I/O) components 1050 may include a wide variety of components to receive input, provide output, produce output, transmit information, exchange information, capture measurements, and so on. The specific input/output (I/O) components 1050 that are included in a particular machine will depend on the type of machine. For example, portable machines such as mobile phones will likely include a touch input device or other such input mechanisms, while a headless server machine will likely not include such a touch input device. It will be appreciated that the input/output (I/O) components 1050 may include many other components that are not shown in FIG. 10. The input/output (I/O) components 1050 are grouped according to functionality merely for simplifying the following discussion and the grouping is in no way limiting. In various example embodiments, the input/output (I/O) components 1050 may include output components 1052 and input components 1054. The output components 1052 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1054 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the input/output (I/O) components 1050 may include biometric components 1056, motion components 1058, environmental components 1060, or position components 1062, among a wide array of other components. For example, the biometric components 1056 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1058 may include acceleration sensor components (e.g., accelerometer), gravitation sensor components, rotation sensor components (e.g., gyroscope), and so forth. The environmental components 1060 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1062 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The input/output (I/O) components 1050 may include communication components 1064 operable to couple the machine 1000 to a network 1080 or devices 1070 via a coupling 1082 and a coupling 1072 respectively. For example, the communication components 1064 may include a network interface component or other suitable device to interface with the network 1080. In further examples, the communication components 1064 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1070 may be another machine or any of a wide variety of peripheral devices (e.g., a peripheral device coupled via a Universal Serial Bus (USB)).

Moreover, the communication components 1064 may detect identifiers or include components operable to detect identifiers. For example, the communication components 1064 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1062, such as, location via Internet Protocol (IP) geo-location, location via Wi-Fi® signal triangulation, location via detecting a NFC beacon signal that may indicate a particular location, and so forth.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within the scope of embodiments of the present disclosure as represented by the appended claims. The specification and drawings are, accordingly, to be regarded in an illustrative rather than a restrictive sense.

I claim:

1. A non-transitory computer-readable storage medium storing a set of instructions that, when executed by one or more computer processors, causes the one or more computer processors to perform operations, the operations comprising:
   receiving an input via a graphical user interface;
   using the input to create a smart volumetric layout, the smart volumetric layout including an arrangement of one or more smart volumetric shapes; and
   using the input to associate smart shape data to a smart volumetric shape of the one or more smart volumetric shapes, the smart shape data including one or more properties and one or more behaviors that are inherited by one or more digital objects placed within the smart volumetric shape.

2. The non-transitory computer-readable storage medium of claim 1, the operations further comprising applying the one or more properties and the one or more behaviors by changing one or more preexisting associated properties or one or more preexisting associated behaviors of one or more digital objects included in the smart volumetric shape of the one or more smart volumetric shapes.

3. The non-transitory computer-readable storage medium of claim 1, wherein the input describes a modifying of the one or more smart volumetric shapes, the modifying pertaining to a shape, a size, a positioning, or an orientation.

4. The non-transitory computer-readable storage medium of claim 1, the operations further comprising:
 detecting a presence of one or more digital objects in the smart volumetric shape; and
 applying the one or more properties and the one or more behaviors associated with the smart volumetric shape to the one or more digital objects.

5. The non-transitory computer-readable storage medium of claim 1, the operations further comprising:
 packaging the smart volumetric layout into a runtime executable application, the packaging including adding the one or more smart volumetric shapes, one or more digital objects included in the one or more smart volumetric shapes, and the one or more properties and the one or more behaviors; and
 presenting an interactive visual representation of the smart volumetric layout via the graphical user interface or an additional graphical user interface.

6. The non-transitory computer-readable storage medium of claim 1, the operations further comprising providing the graphical user interface for display on a display device, the graphical user interface comprising:
 a first display area for creating, visualizing, and manipulating a smart volumetric layout object; and
 a second display area for selecting and including at least a subset of a plurality of digital objects for inclusion into a smart volumetric shape of the smart volumetric layout object.

7. The non-transitory computer-readable storage medium of claim 6, wherein the first display area integrates camera data describing a view of an environment, and wherein the creating, visualizing, and manipulating of the smart volumetric layout object is associated with the environment.

8. The non-transitory computer-readable storage medium of claim 4, wherein the applying of the one or more properties associated with a smart volumetric shape to the one or more digital objects includes deforming, reorienting, or resizing the one or more digital objects to fit within the smart volumetric shape.

9. The non-transitory computer-readable storage medium of claim 1, wherein a behavior may include motion control instructions for an object, the motion control instructions including a predetermined physical motion that is associated with a real-world object.

10. A method comprising:
 one or more computer processors;
 one or more computer memories;
 a set of instructions incorporated into the one or more computer memories, the set of instructions configuring the one or more computer processors to perform operations, the operations comprising:
 receiving an input via a graphical user interface;
 using the input to create a smart volumetric layout, the smart volumetric layout including an arrangement of one or more smart volumetric shapes; and
 using the input to associate smart shape data to a smart volumetric shape of the one or more smart volumetric shapes, the smart shape data including one or more properties and one or more behaviors that are inherited by one or more digital objects placed within the smart volumetric shape.

11. The method of claim 10, the operations further comprising applying the one or more properties and the one or more behaviors by changing one or more preexisting associated properties or one or more preexisting associated behaviors of one or more digital objects included in the smart volumetric shape of the one or more smart volumetric shapes.

12. The method of claim 10, wherein the input describes a modifying of the one or more smart volumetric shapes, the modifying pertaining to a shape, a size, a positioning, or an orientation.

13. The method of claim 10, the operations further comprising:
 detecting a presence of one or more digital objects in the smart volumetric shape; and
 applying the one or more properties and the one or more behaviors associated with the smart volumetric shape to the one or more digital objects.

14. The method of claim 10, the operations further comprising:
 packaging the smart volumetric layout into a runtime executable application, the packaging including adding the one or more smart volumetric shapes, one or more digital objects included in the one or more smart volumetric shapes, and the one or more properties and the one or more behaviors; and
 presenting an interactive visual representation of the smart volumetric layout via the graphical user interface or an additional graphical user interface.

15. The method of claim 10, the operations further comprising providing the graphical user interface for display on a display device, the graphical user interface comprising:
 a first display area for creating, visualizing and manipulating a smart volumetric layout object; and
 a second display area for selecting and including at least a subset of a plurality of digital objects for inclusion into a smart volumetric shape of the smart volumetric layout object.

16. The method of claim 15, wherein the first display area integrates camera data describing a view of an environment, and wherein the creating, visualizing and manipulating of the smart volumetric layout object is associated with the environment.

17. The method of claim 13, wherein the applying of the one or more properties associated with a smart volumetric shape to the one or more digital objects includes deforming, reorienting, or resizing the one or more digital objects to fit within the smart volumetric shape.

18. The method of claim 10, wherein a behavior may include motion control instructions for an object, the motion control instructions including a predetermined physical motion that is associated with a real-world object.

19. A system comprising:
 receiving an input via a graphical user interface;
 using the input to create a smart volumetric layout, the smart volumetric layout including an arrangement of one or more smart volumetric shapes; and using the input to associate smart shape data to a smart volumetric shape of the one or more smart volumetric shapes, the smart shape data including one or more properties and one or more behaviors that are inherited by one or more digital objects placed within the smart volumetric shape.

20. The system of claim 19, further comprising applying the one or more properties and the one or more behaviors by changing one or more preexisting associated properties or one or more preexisting associated behaviors of one or more digital objects included in the smart volumetric shape of the one or more smart volumetric shapes.

\* \* \* \* \*